(12) United States Patent  
Young

(10) Patent No.: US 7,074,147 B2
(45) Date of Patent: *Jul. 11, 2006

(54) ROLLER CHAIN SPROCKET WITH SYMMETRIC CUSHION RINGS

(75) Inventor: James D. Young, Chesaning, MI (US)

(73) Assignee: Cloyes Gear and Products, Inc., Mentor, OH (US)

( * ) Notice: Subject to any disclaimer, the term of this patent is extended or adjusted under 35 U.S.C. 154(b) by 167 days.

This patent is subject to a terminal disclaimer.

(21) Appl. No.: 10/123,940

(22) Filed: Apr. 16, 2002

(65) Prior Publication Data

US 2002/0169044 A1    Nov. 14, 2002

Related U.S. Application Data

(63) Continuation-in-part of application No. 09/728,698, filed on Dec. 1, 2000, now Pat. No. 6,371,875, which is a continuation of application No. 09/383,128, filed on Aug. 25, 1999, now Pat. No. 6,179,741.

(60) Provisional application No. 60/097,931, filed on Aug. 25, 1998.

(51) Int. Cl.
   *F18H 55/30*     (2006.01)
   *F18H 55/12*     (2006.01)

(52) U.S. Cl. .................. 474/161; 474/156; 474/160

(58) Field of Classification Search .............. 474/153, 474/156, 157, 160, 161, 162, 100
   See application file for complete search history.

(56) References Cited

U.S. PATENT DOCUMENTS

| 527,153 A | 10/1894 | Murphy et al. |
| 975,938 A | 11/1910 | Downey |
| 1,870,801 A | 8/1932 | Engstrom |
| 2,003,528 A | 6/1935 | Best |
| 2,199,292 A | 4/1940 | Pierce |
| 2,492,219 A | 12/1949 | Haefeli |

(Continued)

FOREIGN PATENT DOCUMENTS

DE         1086957    *   8/1960

(Continued)

*Primary Examiner*—Marcus Charles
(74) *Attorney, Agent, or Firm*—Fay, Sharpe, Fagan, Minnich & McKee, LLP

(57) ABSTRACT

A sprocket includes a hub and a plurality of teeth projecting radially outwardly from the hub. At least one cushion ring is located adjacent the teeth, and the cushion ring defines a plurality of compression pads separated from each other by transverse grooves. Each of the compression pads is defined symmetrically about a circumferential mid-point. When part of a sprocket with symmetric tooth spaces, the cushion ring is being operable identically in first and second opposite rotational directions. In one arrangement, the compression pads each include a planar outer surface having a leading and a trailing end, wherein the leading end and trailing end are located a common radial distance from a center of the hub about which the sprocket rotates. The tooth spaces of the sprocket can be symmetric, asymmetric and the root surface can be relieved. The sprocket can include multiple tooth profiles distributed randomly about the hub.

12 Claims, 25 Drawing Sheets

U.S. PATENT DOCUMENTS

| | | |
|---|---|---|
| 2,720,119 A | 10/1955 | Sherman |
| 2,953,930 A | 9/1960 | Meyer |
| 3,057,219 A | 10/1962 | Montgomery |
| 3,448,629 A | 6/1969 | Pfrank et al. |
| 3,597,985 A | 8/1971 | Jeffrey |
| 4,022,072 A | 5/1977 | Chagawa et al. |
| 4,227,422 A | 10/1980 | Kawashima et al. |
| 4,261,214 A | 4/1981 | Watanabe et al. |
| 4,332,574 A | 6/1982 | Aoyama et al. |
| 4,348,199 A | 9/1982 | Oonuma et al. |
| 4,850,942 A | 7/1989 | Dalferth |
| 5,224,903 A | 7/1993 | Langhof et al. |
| 5,360,378 A | 11/1994 | Suzuki et al. |
| 5,397,278 A | 3/1995 | Suzuki et al. |
| 5,819,910 A | 10/1998 | Langer et al. |
| 5,921,879 A * | 7/1999 | Young .................. 474/202 |
| 5,980,408 A | 11/1999 | Schulz |
| 5,993,344 A | 11/1999 | Young |
| 6,179,741 B1 * | 1/2001 | Young .................. 474/161 |

FOREIGN PATENT DOCUMENTS

| | | |
|---|---|---|
| DE | EP 846 889 | 10/1998 |
| DE | EP 846 890 | 10/1998 |
| DE | 199 29 667 C1 | 1/2001 |
| EP | 0 818 644 | 1/1998 |
| EP | 1 120 586 A2 | 8/2001 |
| FR | 1186486 | 9/1959 |
| FR | 2 325 804 | 9/1975 |
| GB | 1 277 277 | 6/1972 |
| JP | 57190160 | 11/1982 |
| JP | 57-173649 | 1/1983 |
| JP | 63214566 A * | 9/1988 |
| JP | 11-2312 | 6/1997 |
| RU | 386186 | 9/1973 |

* cited by examiner

ISO

| Z | A | α (MIN) | α (MAX) | γ (MAX) | γ (MIN) |
|---|---|---|---|---|---|
| 18 | 20.000 | 115.00 | 135.00 | 22.500 | 12.500 |
| 19 | 18.947 | 115.26 | 135.26 | 22.895 | 12.895 |
| 20 | 18.000 | 115.50 | 135.50 | 23.250 | 13.250 |
| 21 | 17.143 | 115.71 | 135.71 | 23.571 | 13.571 |
| 22 | 16.364 | 115.91 | 135.91 | 23.864 | 13.864 |
| 23 | 15.652 | 116.09 | 136.09 | 24.130 | 14.130 |
| 24 | 15.000 | 116.25 | 136.25 | 24.375 | 14.375 |
| 25 | 14.400 | 116.40 | 136.40 | 26.600 | 14.600 |
| 26 | 13.846 | 116.54 | 136.54 | 24.808 | 14.808 |
| 27 | 13.333 | 116.67 | 136.67 | 25.000 | 15.000 |
| 28 | 12.857 | 116.79 | 136.79 | 25.179 | 15.179 |
| 29 | 12.414 | 116.90 | 136.90 | 25.345 | 15.345 |
| 30 | 12.000 | 117.00 | 137.00 | 25.500 | 15.500 |

FIG. 4
PRIOR ART

ASYMMETRICAL

| | | 1 | | 2 | | 3 | |
|---|---|---|---|---|---|---|---|
| Z | A | β (MAX) | γ (MIN) | β (MAX) | γ (MIN) | β (MAX) | γ (MIN) |
| 18 | 20.000 | 73.75 | 8.75 | 76.92 | 4.33 | 80.00 | -3 |
| 19 | 18.947 | 74.08 | 9.03 | 77.29 | 4.53 | 80.53 | -3 |
| 20 | 18.000 | 74.38 | 9.28 | 77.62 | 4.71 | 81.00 | -3 |
| 21 | 17.143 | 74.64 | 9.50 | 77.92 | 4.87 | 81.43 | -3 |
| 22 | 16.364 | 74.89 | 9.70 | 78.19 | 5.02 | 81.82 | -3 |
| 23 | 15.652 | 75.11 | 9.89 | 78.43 | 5.15 | 82.17 | -3 |
| 24 | 15.000 | 75.31 | 10.06 | 78.66 | 5.28 | 82.50 | -3 |
| 25 | 14.400 | 75.50 | 10.22 | 78.87 | 5.39 | 82.80 | -3 |
| 26 | 13.846 | 75.67 | 10.37 | 79.06 | 5.50 | 83.08 | -3 |
| 27 | 13.333 | 75.83 | 10.50 | 79.24 | 5.59 | 83.33 | -3 |
| 28 | 12.857 | 75.98 | 10.63 | 79.41 | 5.68 | 83.57 | -3 |
| 29 | 12.414 | 76.12 | 10.74 | 79.56 | 5.77 | 83.79 | -3 |
| 30 | 12.000 | 76.25 | 10.85 | 79.70 | 5.85 | 84.00 | -3 |

FIG. 5

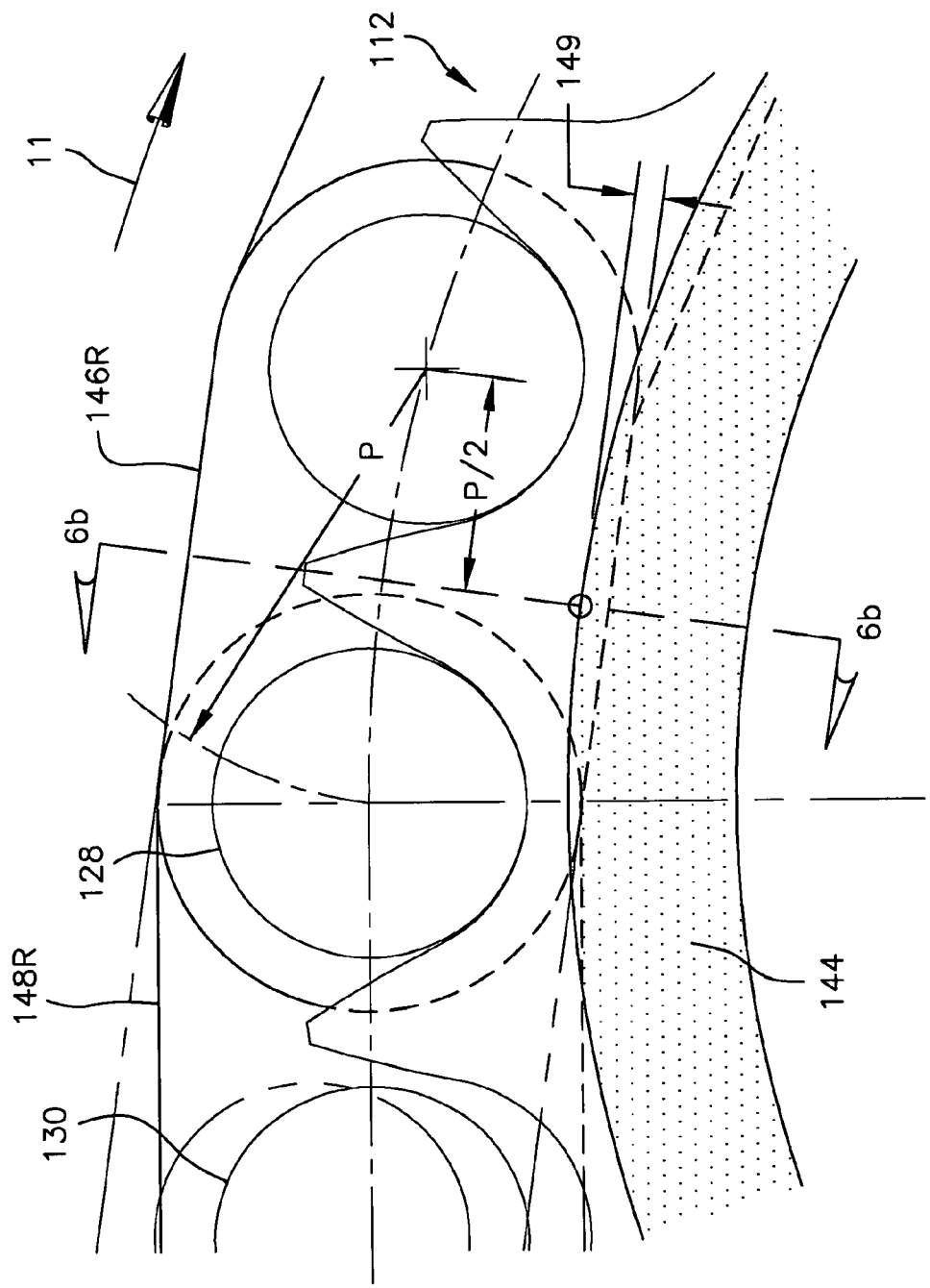

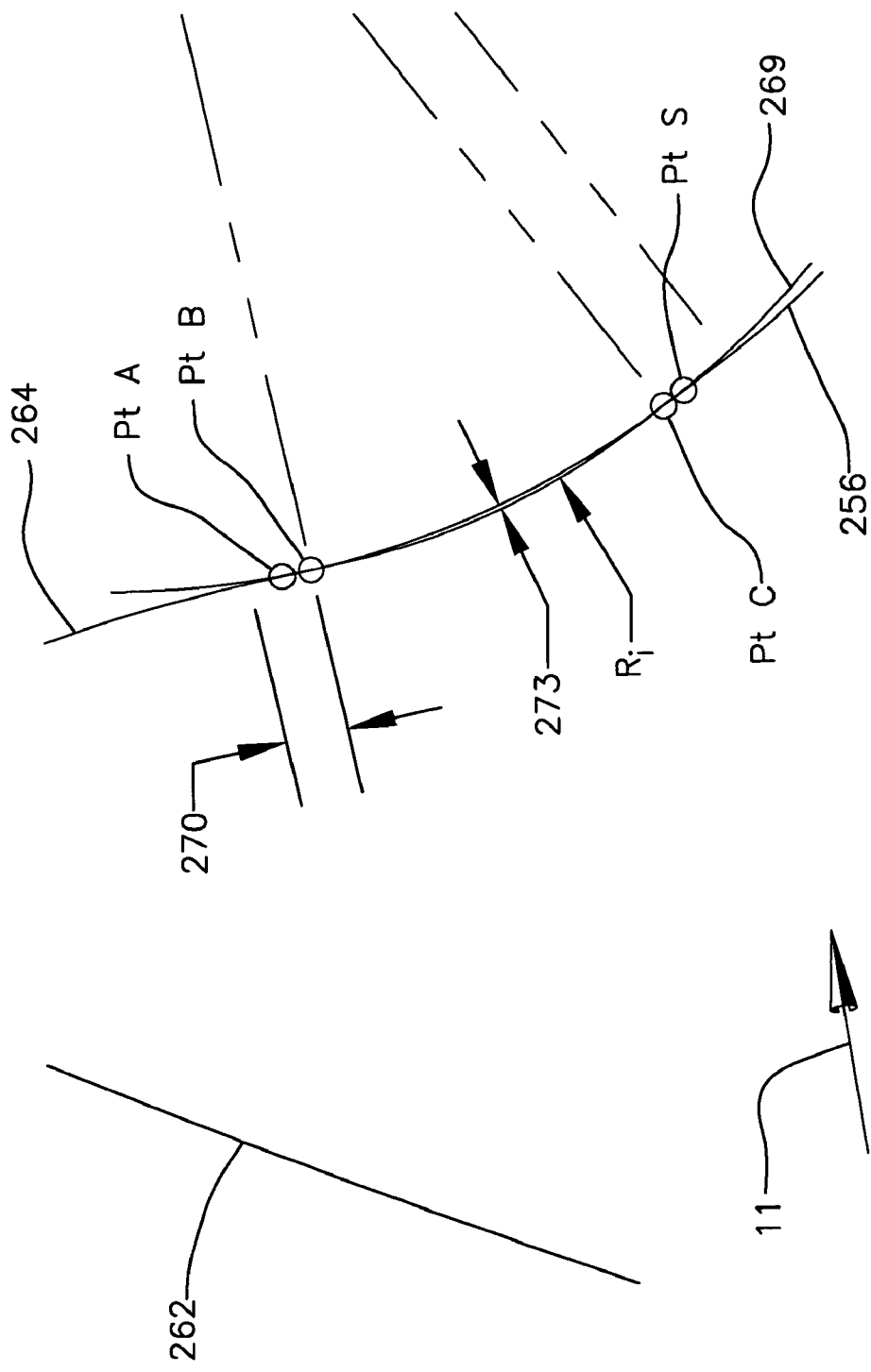

ROLLER CHAIN SPROCKET WITH SYMMETRIC CUSHION RINGS

CROSS REFERENCE TO RELATED APPLICATIONS

This application is a continuation-in-part of U.S. application Ser. No. 09/728,698 filed Dec. 1, 2000, now U.S. Pat. No. 6,371,875, which is a continuation of U.S. application Ser. No. 09/383,128 filed Aug. 25, 1999, now U.S. Patent No. 6,179,741, which claims priority from and benefit of the filing date of U.S. provisional application Ser. No. 60/097,931 filed Aug. 25, 1998.

BACKGROUND OF THE INVENTION

The present invention relates to the automotive timing chain art. It finds particular application in conjunction with a roller chain sprocket for use in automotive camshaft drive applications and will be described with particular reference thereto. However, the present invention may also find application in conjunction with other types of chain drive systems and applications where reducing the noise levels associated with chain drives is desired.

Roller chain sprockets for use in camshaft drives of automotive engines are typically manufactured according to one or more international standards such as DIN, JIS, ISO, etc. The ISO-606:1994(E) (International Organization for Standardization) standard specifies requirements for short-pitch precision roller chains and associated chain wheels or sprockets.

FIG. 1 illustrates a symmetrical tooth space form for an ISO-606 compliant sprocket. The tooth space has a continuous fillet or root radius $R_i$ extending from one tooth flank (i.e., side) to the adjacent tooth flank as defined by the roller seating angle $\alpha$. The flank radius $R_f$ is tangent to the roller seating radius $R_i$ at the tangency point TP. A chain with a link pitch P has rollers of diameter $D_1$ in contact with the tooth spaces. The ISO sprocket has a chordal pitch also of length P, a root diameter $D_2$, and Z number of teeth. The pitch circle diameter PD, tip or outside diameter OD, and tooth angle A (equal to 360°/Z) further define the ISO-606 compliant sprocket. The maximum and minimum roller seating angle $\alpha$ is defined as:

$$\alpha_{max}=140°-(90°/Z) \text{ and } \alpha_{min}=120°-(90°/Z)$$

With reference to FIG. 2, an exemplary ISO-606 compliant roller chain drive system 10 rotates in a clockwise direction as shown by arrow 11. The chain drive system 10 includes a drive sprocket 12, a driven sprocket 14 and a roller chain 16 having a number of rollers 18. The sprockets 12, 14, and chain 16 each generally comply with the ISO-606 standard.

The roller chain 16 engages and wraps about sprockets 12 and 14 and has two spans extending between the sprockets, slack strand 20 and taut strand 22. The roller chain 16 is under tension as shown by arrows 24. A central portion of the taut strand 22 may be guided between the driven sprocket 14 and the drive sprocket 12 with a conventional chain guide (not shown). A first roller 28 is shown at the onset of meshing at a 12 o'clock position on the drive sprocket 12. A second roller 30 is adjacent to the first roller 28 and is the next roller to mesh with the drive sprocket 12.

Chain drive systems have several components of undesirable noise. A major source of roller chain drive noise is the sound generated as a roller leaves the span and collides with the sprocket during meshing. The resultant impact noise is repeated with a frequency generally equal to that of the frequency of the chain meshing with the sprocket. The loudness of the impact noise is a function of the impact energy ($E_A$) occurring during the meshing process. The impact energy ($E_A$) is related to engine speed, chain mass, and the impact velocity between the chain and the sprocket at the onset of meshing. The impact velocity is affected by the chain-sprocket engagement geometry, of which an engaging flank $$E_A = \frac{wP}{2000}V_A^2;$$

$$V_A = \frac{\pi n P}{30000}\sin\left(\frac{360}{Z}+\gamma\right);$$

$$\gamma = \frac{180-A-\alpha}{2}; \text{ and}$$

pressure angle $\gamma$ (FIG. 3) is a factor, where:
 $E_A$=Impact Energy [N·m]
 $V_A$=Roller Impact Velocity [m/s]
 $\gamma$=Engaging Flank Pressure Angle
 n=Engine Speed [RPM]
 w=Chain Mass [Kg/m]
 Z=Number of Sprocket Teeth
 A=Tooth Angle (360°/Z)
 $\alpha$=Roller Seating Angle
 P=Chain Pitch (Chordal Pitch)

The impact energy ($E_A$) equation presumes the chain drive kinematics will conform generally to a quasi-static analytical model and that the roller-sprocket driving contact will occur at a tangent point TP (FIG. 3) of the flank and root radii as the sprocket collects a roller from the span.

As shown in FIG. 3, the pressure angle $\gamma$ is defined as the angle between a line A extending from the center of the engaging roller 28, when it is contacting the engaging tooth flank at the tangency point TP, through the center of the flank radius $R_f$, and a line B connecting the centers of the fully seated roller 28, when it is seated on root diameter $D_2$, and the center of the next meshing roller 30, as if it were also seated on root diameter $D_2$ in its engaging tooth space. The roller seating angles $\alpha$ and pressure angles $\gamma$ listed in FIG. 4 are calculated from the equations defined above. It should be appreciated that $\gamma$ is a minimum when $\alpha$ is a maximum. Thus, the exemplary 23-tooth, ISO-606 compliant, drive sprocket 12 shown in FIGS. 2 and 3 will have a pressure angle $\gamma$ in the range of 14.13° to 24.13° as listed in the table of FIG. 4.

FIG. 3 also shows the engagement path (phantom rollers) and the driving contact position of roller 28 (solid) as the drive sprocket 12 rotates in the direction of arrow 11. FIG. 3 depicts the theoretical case with chain roller 28 seated on root diameter $D_2$ of a maximum material sprocket with both chain pitch and sprocket chordal pitch equal to theoretical pitch P. For this theoretical case, the noise occurring at the onset of roller engagement has a radial component $F_R$ as a result of roller 28 colliding with the root surface $R_i$ and a tangential component $F_T$ generated as the same roller 28 collides with the engaging tooth flank at point TP as the roller moves into driving contact. It is believed that the radial impact occurs first, with the tangential impact following nearly simultaneously. Roller impact velocity $V_A$ is shown to act through, and is substantially normal to, engaging flank tangent point TP with roller 28 in driving contact at point TP.

The impact energy ($E_A$) equation accounts only for a tangential roller impact during meshing. The actual roller engagement, presumed to have a tangential and radial impact (occurring in any order), would therefore seem to be at variance with the impact energy ($E_A$) equation. The application of this quasi-static model, which is beneficially used as a directional tool, permits an analysis of those features that may be modified to reduce the impact energy occurring during the tangential roller-sprocket collision at the onset of meshing. The radial collision during meshing, and its effect on noise levels, can be evaluated apart from the impact energy ($E_A$) equation.

Under actual conditions as a result of feature dimensional tolerances, there will normally be a pitch mismatch between the chain and sprocket, with increased mismatch as the components wear in use. This pitch mismatch serves to move the point of meshing impact, with the radial collision still occurring at the root surface $R_i$ but not necessarily at $D_2$. The tangential collision will normally be in the proximity of point TP, but this contact could take place high up on the engaging side of root radius $R_i$ or even radially outward from point TP on the engaging flank radius $R_f$ as a function of the actual chain-sprocket pitch mismatch.

Reducing the engaging flank pressure angle γ reduces the meshing noise levels associated with roller chain drives, as predicted by the impact energy ($E_A$) equation set forth above. It is feasible but not recommended to reduce the pressure angle γ while maintaining a symmetrical tooth profile, which could be accomplished by simply increasing the roller seating angle α, effectively decreasing the pressure angle for both flanks. This profile as described requires that a worn chain would, as the roller travels around a sprocket wrap (discussed below), interface with a much steeper incline and the rollers would necessarily ride higher up on the coast flank prior to leaving the wrap.

Another source of chain drive noise is the broadband mechanical noise generated in part by shaft torsional vibrations and slight dimensional inaccuracies between the chain and the sprockets. Contributing to a greater extent to the broadband mechanical noise level is the intermittent or vibrating contact that occurs between the unloaded rollers and the sprocket teeth as the rollers travel around the sprocket wrap. In particular, ordinary chain drive system wear comprises sprocket tooth face wear and chain wear. The chain wear is caused by bearing wear in the chain joints and can be characterized as pitch elongation. It is believed that a worn chain meshing with an ISO standard sprocket will have only one roller in driving contact and loaded at a maximum loading condition.

With reference again to FIG. 2, driving contact at maximum loading occurs as a roller enters a drive sprocket wrap 32 at engagement. Engaging roller 28 is shown in driving contact and loaded at a maximum loading condition. The loading on roller 28 is primarily meshing impact loading and the chain tension loading. The next several rollers in the wrap 32 forward of roller 28 share in the chain tension loading, but at a progressively decreasing rate. The loading of roller 28 (and to a lesser extent for the next several rollers in the wrap) serves to maintain the roller in solid or hard contact with the sprocket root surface 34.

A roller 36 is the last roller in the drive sprocket wrap 32 prior to entering the slack strand 20. Roller 36 is also in hard contact with drive sprocket 12, but at some point higher up (e.g., radially outwardly) on the root surface 34. With the exception of rollers 28 and 36, and the several rollers forward of roller 28 that share the chain tension loading, the remaining rollers in the drive sprocket wrap 32 are not in hard contact with the sprocket root surface 34, and are therefore free to vibrate against the sprocket root surfaces as they travel around the wrap, thereby contributing to the generation of unwanted broadband mechanical noise.

A roller 38 is the last roller in a sprocket wrap 40 of the driven sprocket 14 before entering the taut strand 22. The roller 38 is in driving contact with the sprocket 14. As with the roller 36 in the drive sprocket wrap 32, a roller 42 in the sprocket wrap 40 is in hard contact with a root radius 44 of driven sprocket 14, but generally not at the root diameter.

It is known that providing pitch line clearance (PLC) between sprocket teeth promotes hard contact between the chain rollers and sprocket in the sprocket wrap, even as the roller chain wears. The amount of pitch line clearance added to the tooth space defines a length of a short arc that is centered in the tooth space and forms a segment of the root diameter $D_2$. The root fillet radius $R_i$ is tangent to the flank radius $R_F$ and the root diameter arc segment. The tooth profile is still symmetrical, but $R_i$ is no longer a continuous fillet radius from one flank radius to the adjacent flank radius. This has the effect of reducing the broadband mechanical noise component of a chain drive system. However, adding pitch line clearance between sprocket teeth does not reduce chain drive noise caused by the roller-sprocket collision at impact.

Another attempt to reduce the noise levels associated with roller chain meshing is described in U.S. Pat. No. 5,397,278 which discloses the undercutting or relieving of the root surfaces so as to eliminate the radial roller-root surface contact at the onset of meshing. However, the invention disclosed in the '278 patent does not modulate the meshing impact frequency. That is, all of the tooth profiles are substantially identical. Therefore, the flank impacts occur at the meshing frequency. An additional disadvantage of the sprocket disclosed in the '278 patent is that the rollers contact both engaging and disengaging flanks at full mesh. Thus, a roller can become wedged within the tooth space when no clearance is provided between the roller and a disengaging flank with the roller seated in full mesh.

A further attempt to reduce the noise levels associated with roller chain meshing is to incorporate one or more elastomeric cushion rings that serve to buffer or soften the engaging impact of a roller as it leaves the span and collides with a sprocket during the meshing process. With reference to FIG. 6, a drive sprocket 112, associated with a conventional roller chain drive system 110, incorporates symmetrical, ISO-606 compliant tooth space profiles. The drive sprocket 112 is substantially identical to the drive sprocket 12 (FIG. 2) except that the drive sprocket 112 includes two circular cushion rings 144, one secured on each hub of the sprocket 112. Each cushion ring 144 has a continuous or otherwise uniform outer surface that is defined by a radius R. As is known in the art, the cushion rings 144 serve to buffer or soften the engaging impact of a roller as it leaves the span and collides with a sprocket during the meshing process.

More particularly, as shown in FIGS. 6a and 6b, a roller 128, a bushing 129, and an associated pin 131, are carried by two sets of overlapping link plates 146L, 146R and 148L, 148R. As the drive sprocket 112 rotates in the direction of arrow 11, the link plates 146 impact, and then compress or otherwise deform, the outer surfaces of both cushion rings 144 prior to roller 128 colliding with the associated sprocket tooth, followed consecutively by the link plates 148. As a result, the impact velocity of the roller 128 is reduced prior to meshing with the sprocket, thereby reducing meshing impact noise. The maximum amount of cushion ring compression 149 occurs close to, or at, the midpoint P/2 between adjacent rollers having a chain pitch P. FIG. 6b shows the rubber compression to alternate in consecutive pitches between link plates 146 and link plates 148. A typical problem with cushion rings is one of durability. That is, wear and compression set of the elastomeric material of the cushion rings can be expected in the area of maximum ring compression after repeated link impacts. In addition, the cushion ring may eventually fatigue as a result of the repeated compression cycles during the meshing process.

Accordingly, it is considered desirable to develop a new and improved roller chain drive system and sprocket which meets the above-stated needs and overcomes the foregoing disadvantages and others while providing better and more advantageous results.

SUMMARY OF THE INVENTION

In accordance with one aspect of the present development, a sprocket includes a hub and a plurality of teeth projecting radially outwardly from the hub. At least one cushion ring is located adjacent the teeth, and the cushion ring defines a plurality of compression pads separated from each other by transverse grooves. Each of the compression pads is defined symmetrically about a circumferential mid-point.

In accordance with another aspect of the present development, a sprocket comprises a hub and a plurality of teeth that project radially outwardly from the hub. At least one cushion ring is located adjacent the teeth. The cushion ring defines a symmetrical outer surface that comprises a plurality of axially extending grooves defined therein.

In accordance with another aspect of the present development, a sprocket comprises a hub and a plurality of teeth projecting radially outwardly from the hub. At least one cushion ring is located adjacent the teeth and comprises a plurality of compression pads separated from each other by grooves. The cushion ring is being operable identically in first and second opposite rotational directions.

In accordance with a further aspect of the present development, a sprocket comprises a hub and a plurality of teeth projecting radially outwardly from the hub. At least one cushion ring is located adjacent the teeth, and the cushion ring defines a plurality of compression pads separated from each other by transverse grooves. Each of the compression pads comprises an outer surface having a leading end and a trailing end located a common radial distance from a center of the hub about which the sprocket rotates.

One advantage of the present invention is the provision of a sprocket that includes at least one cushion ring designed to increase the fatigue life of the elastomeric material that forms the cushion ring.

Another advantage of the present invention is the provision of a sprocket having two sets of sprocket teeth incorporating different tooth profiles, and at least one cushion ring that cooperates with the tooth profiles to reduce chain drive system noise levels below a noise level that either the tooth profiles or the cushion ring alone would produce.

Another advantage of the present invention is the provision of a sprocket having two different sets of asymmetrical sprocket teeth each incorporating root relief.

Another advantage of the present invention is the provision of a sprocket that phases or modulates the frequency of initial roller-to-engaging flank contacts of a first tooth profile relative to initial roller-to-engaging flank contacts of a second tooth profile thereby altering the rhythm of the initial roller-to-first engaging flank and the roller-to-second engaging flank contacts.

Yet another advantage of the present invention is the provision of a sprocket that minimizes impact noise generated by a roller-sprocket collision during meshing and/or broadband mechanical noise generated by unloaded rollers in a sprocket wrap.

A still further advantage of the present invention is the provision of a sprocket that provides a "staged" roller impact (i.e., an extension of the roller meshing interval) where a tangential roller-sprocket impact occurs first followed by a radial roller-sprocket impact at full mesh.

Yet a further advantage of the present invention is the provision of a sprocket that spreads a roller engagement over a significant time interval to provide for a more gradual load transfer thereby minimizing a roller-sprocket impact and the inherent noise generated therefrom.

A still further advantage of the present invention resides in the provision of a sprocket including symmetrical tooth spaces including root relief and cushion rings whereby rollers of an associated roller chain are spaced from the relieved root surfaces in the respective tooth spaces when the rollers are fully seated in the respective tooth spaces.

Still further advantages of the present invention will become apparent to those of ordinary skill in the art upon reading and understanding the following detailed description of the preferred embodiments.

BRIEF DESCRIPTION OF THE DRAWINGS

The invention may take form in various components and arrangements of components, and in various steps and arrangements of steps. The drawings are only for purposes of illustrating the preferred embodiments and are not to be construed as limiting the invention.

FIG. 4 is a table listing roller seating angles α and pressure angles γ for a number of different ISO-606 complaint sprocket sizes;

FIG. 5 is a table listing the maximum Beta (β) angles and the corresponding pressure angles (γ) for three different asymmetrical tooth space profiles (1–3) of varying sprocket sizes of the present invention;

FIG. 6a is an enlarged partial view of the drive sprocket of FIG. 6 showing the interaction between a roller chain link plate and the cushion ring;

FIG. 6b is a cross section view through the roller chain link plate taken along the line 6b—6b in FIG. 6a;

FIG. 9a is an enlarged partial view of an engaging flank of the first asymmetrical tooth space profile of FIG. 9 with a roller fully seated in two-point contact;

DETAILED DESCRIPTION OF THE PREFERRED EMBODIMENTS

This invention relates to sprockets having symmetric and/or asymmetric teeth or tooth spaces, and also relates to sprockets having multiple arbitrarily positioned asymmetric tooth profiles (referred to herein as random engagement sprockets). In accordance with the present invention, any of these sprockets includes one or more cushion rings formed in accordance with the present invention. Furthermore, the particular sprockets and tooth profiles described herein are intended to be examples of preferred embodiments, and it is not intended that the invention be limited to these preferred embodiments in any way.

Figure 7:
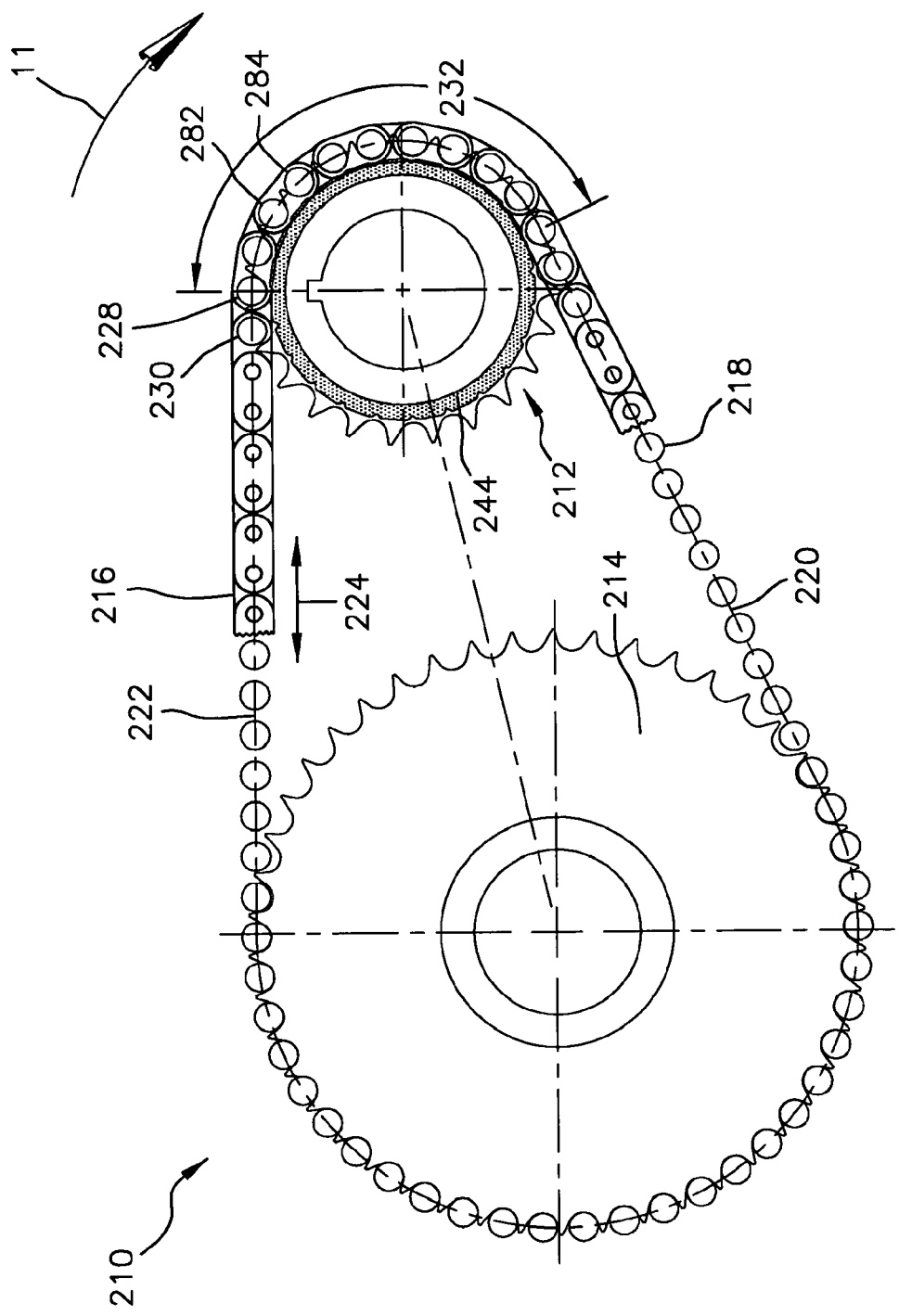
FIG. 7 illustrates an exemplary roller chain drive system that incorporates the features of the present invention therein.

With reference now to FIG. 7, a roller chain drive system 210 that incorporates the features of the present invention therein. The roller chain drive system 210 includes a random-engagement drive sprocket 212, a driven sprocket 214, and a roller chain 216 having a number of rollers 218 which engage and wrap about sprockets 212, 214. The sprockets 212, 214 rotate in a clockwise direction as shown by arrow 11.

The roller chain 216 has two spans extending between the sprockets, slack strand 220 and taut strand 222. The roller chain 216 is under tension as shown by arrows 224. A central portion of the taut strand 222 may be guided between the driven sprocket 214 and the drive sprocket 212 with a chain guide (not shown). A first roller 228 is shown fully seated at a 12 o'clock position on the drive sprocket 212. A second roller 230 is adjacent to the first roller 228 and is the next roller to mesh with the drive sprocket 212.

To facilitate the description of an asymmetrical tooth profiles of the present invention, reference will be made only to the drive sprocket 212. However, the asymmetrical tooth profiles of the present invention are equally applicable to the driven sprocket 214, as well as to other types of sprockets such as idler sprockets and sprockets associated with counter rotating balance shafts, etc.

Figure 8:
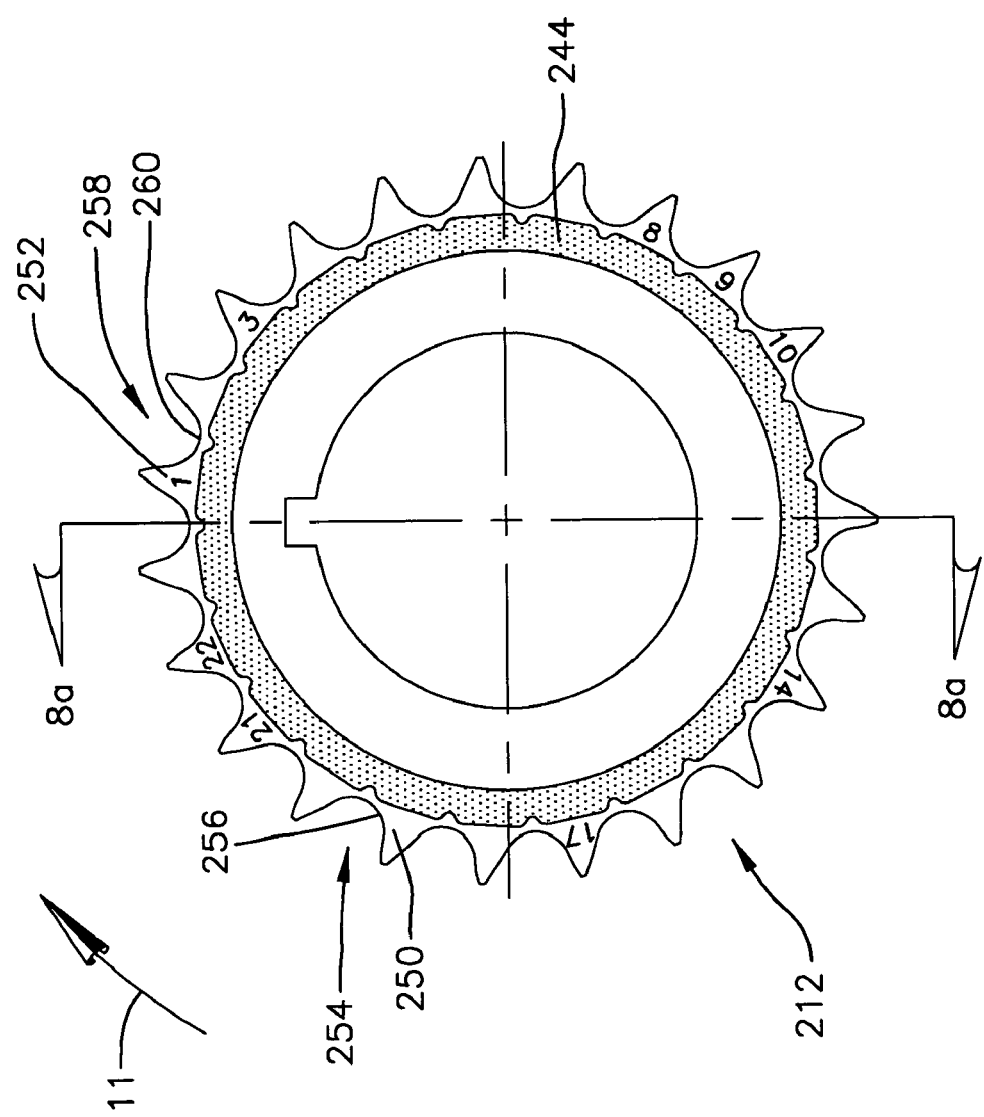
FIG. 8 illustrates a random-engagement roller chain drive sprocket of the drive system of FIG. 7.
Figure 8A:
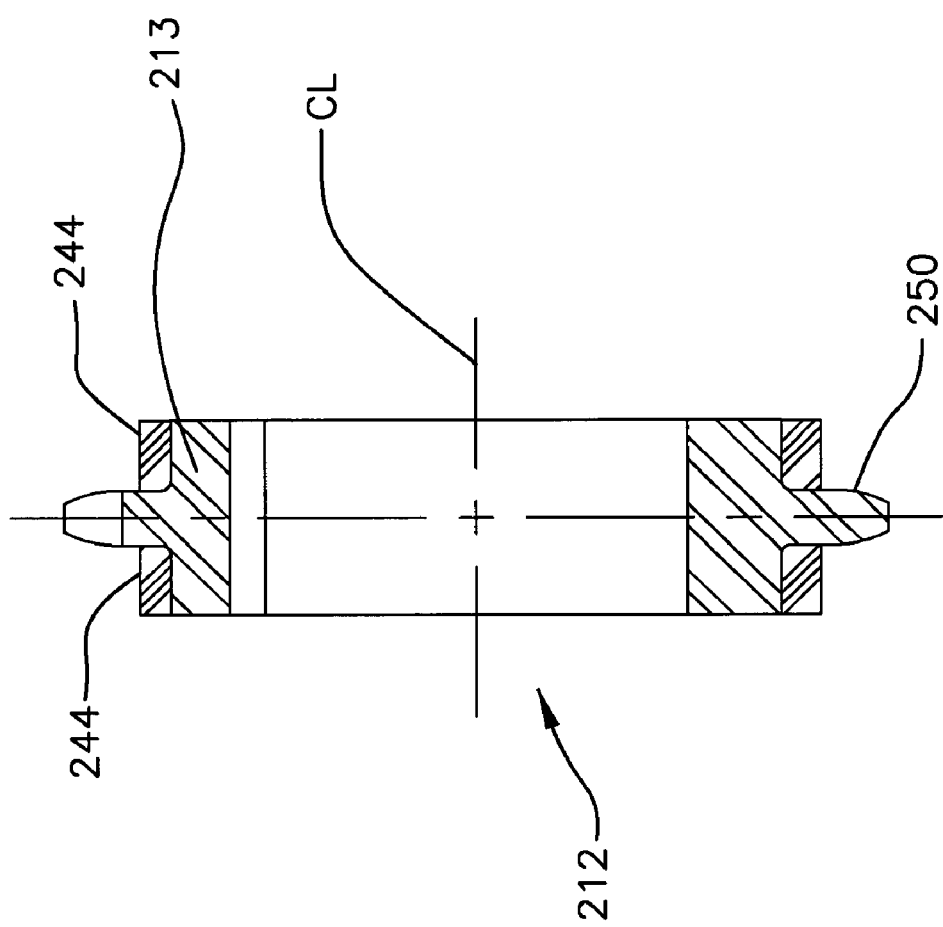
FIG. 8a is a cross section view through the sprocket taken along the line 8a—8a of FIG. 8.

With continuing reference to FIG. 7 and particular reference to FIGS. 8 and 8a, the random-engagement roller chain drive sprocket 212 is illustrated as a 23-tooth sprocket. However, the sprocket 212 may have more or less teeth, as desired. The sprocket 212 includes a central hub 213, a first group of sprocket teeth 250 (not individually numbered) and a second group of sprocket teeth 252 (individually numbered as sprocket teeth 1, 3, 8, 9, 10, 14, 17, 21, and 22) arbitrarily or non-regularly positioned around the circumference of the hub 213. In the illustrated embodiment being described, there are fourteen sprocket teeth 250 and nine sprocket teeth 252 arbitrarily positioned around the sprocket 212. However, it should be appreciated that the number and position of each type of sprocket tooth can vary without departing from the scope of the invention.

With reference now also to FIGS. 8 and 8a, the sprocket 212 includes two elastomeric cushion or damper rings 244 formed in accordance with the present invention. The cushion rings 244 are secured or otherwise attached in a conventional manner to the hub 213 adjacent opposite axial faces of the sprocket teeth, i.e., on opposite axial sides of the teeth 250, 252. In the preferred embodiment the cushion rings are formed from a conventional elastomeric material such as a Nitrile rubber compound, but any other suitable resilient and durable material can be used without departing from the overall scope and intent of the present invention.

The two sets of sprocket teeth 250, 252 are arranged in a random pattern in order to modify the meshing impact frequency by altering the point and rhythm of initial roller-to-sprocket contact. However, the two sets of sprocket teeth 250, 252 could be arranged in many different random patterns. Further, it is also contemplated that the two sets of sprocket teeth 250, 252 could be arranged in many regular patterns that would work equally as well. In all cases, the arrangement of two sets of sprocket teeth on a sprocket provides a means for breaking-up or modulating the meshing frequency impact noise normally associated with and induced by a full complement of substantially identically shaped sprocket teeth. The meshing frequency noise reduction is achieved, in part, by altering the point and rhythm of initial roller-to-sprocket contact.

With specific reference now to FIG. 8, it can be seen that the sprocket teeth 250 each include an engaging side or flank profile that cooperates with a disengaging side or flank profile of an adjacent tooth (in a clockwise-manner) to form a first asymmetrical tooth space 254 having a root surface 256. The numbered sprocket teeth 252 each include an engaging side or flank profile that cooperates with a disengaging side or flank profile of an adjacent tooth (in a clockwise-manner) to form a second asymmetrical tooth space 258 having a root surface 260. As described further below, the first and second groups of sprocket teeth 250, 252 cooperate with the cushion rings 244 to reduce chain drive system noise levels below a noise level which either tooth profile used alone would produce.

Figure 9:
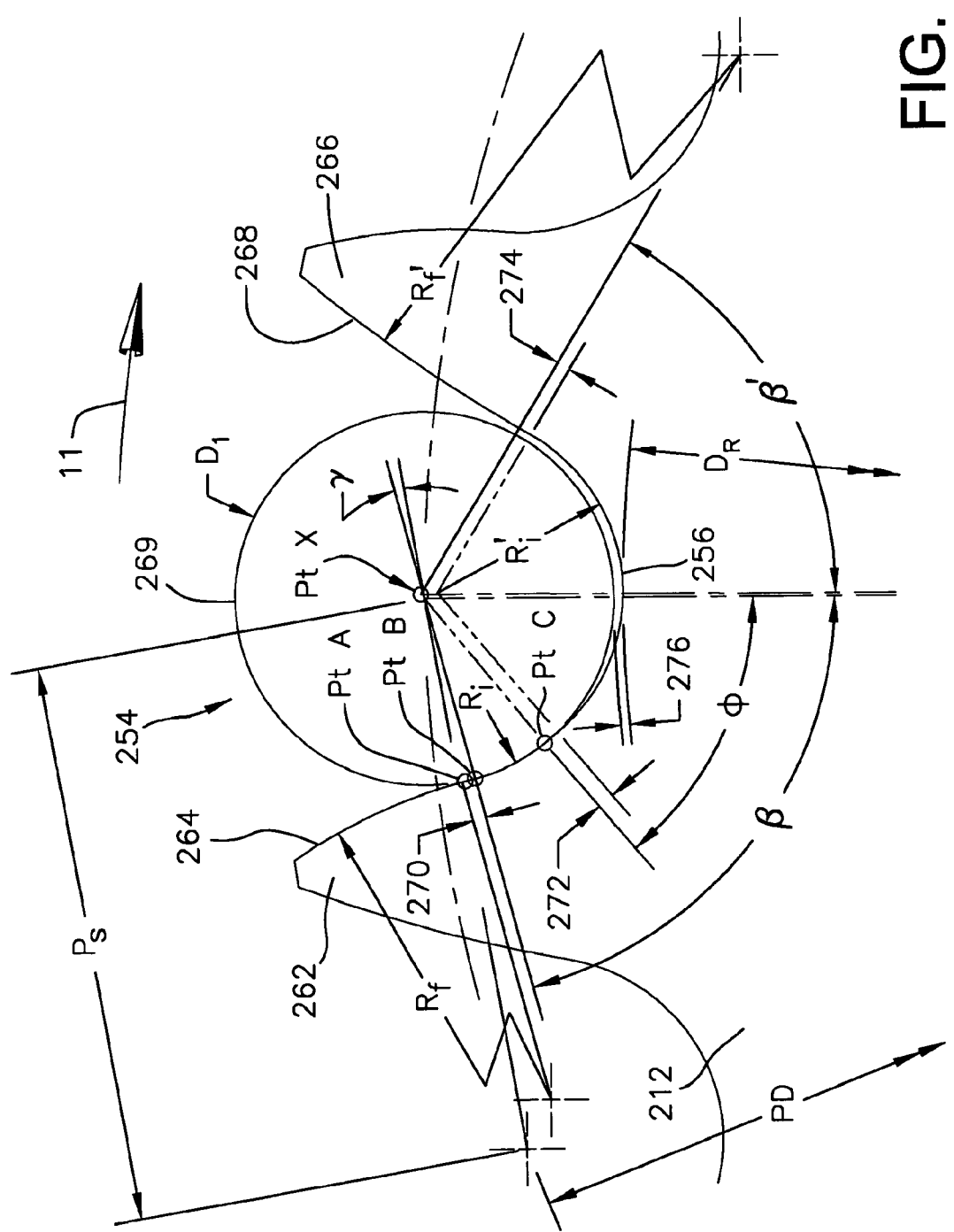
FIG. 9 illustrates a first asymmetrical tooth space profile for the sprocket of FIG. 8.
Figure 9B:
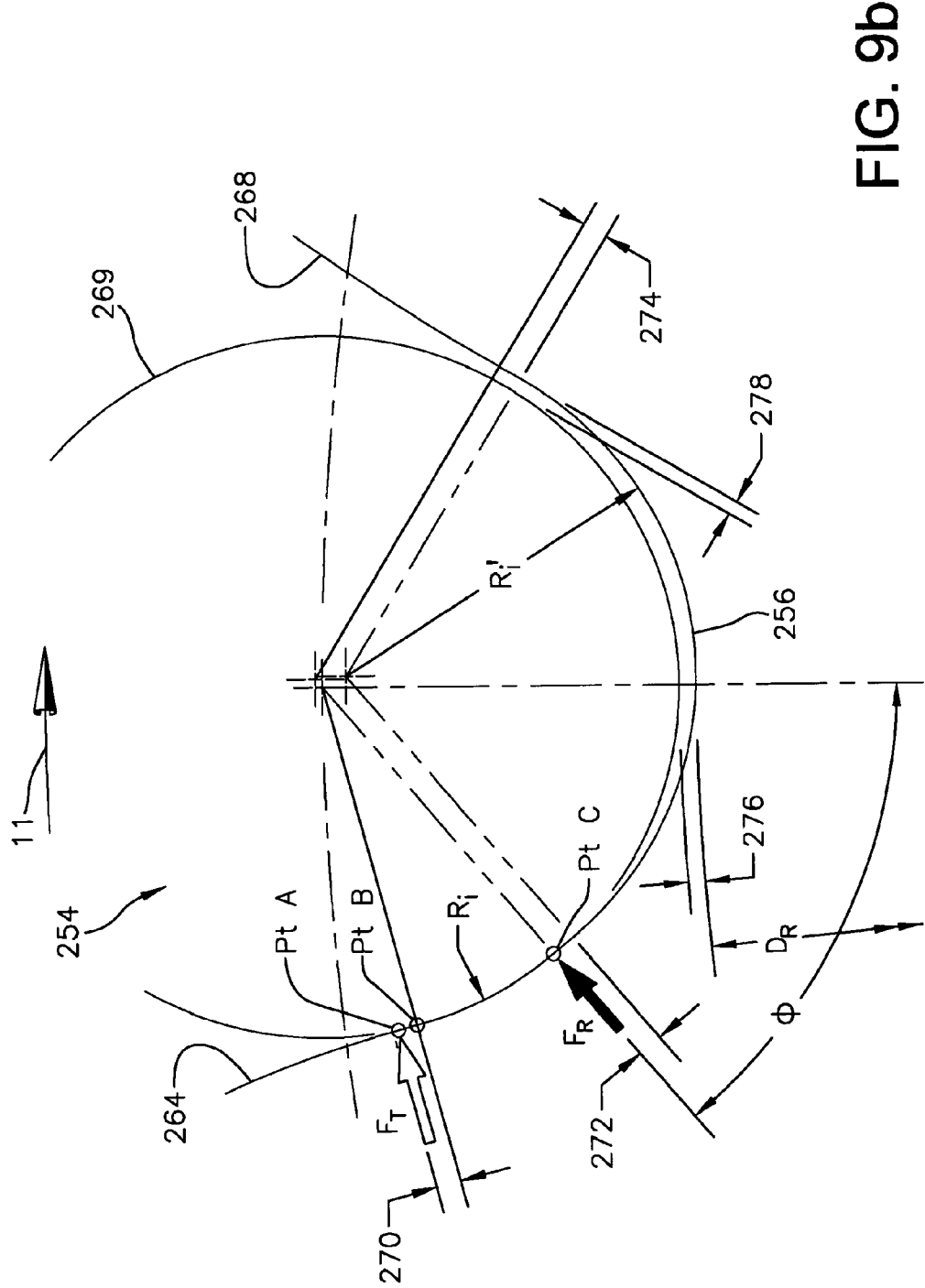
FIG. 9b is an enlarged partial view of the first asymmetrical tooth space profile of FIG. 9 showing a roller fully seated in two-point mesh.
Figure 9C:
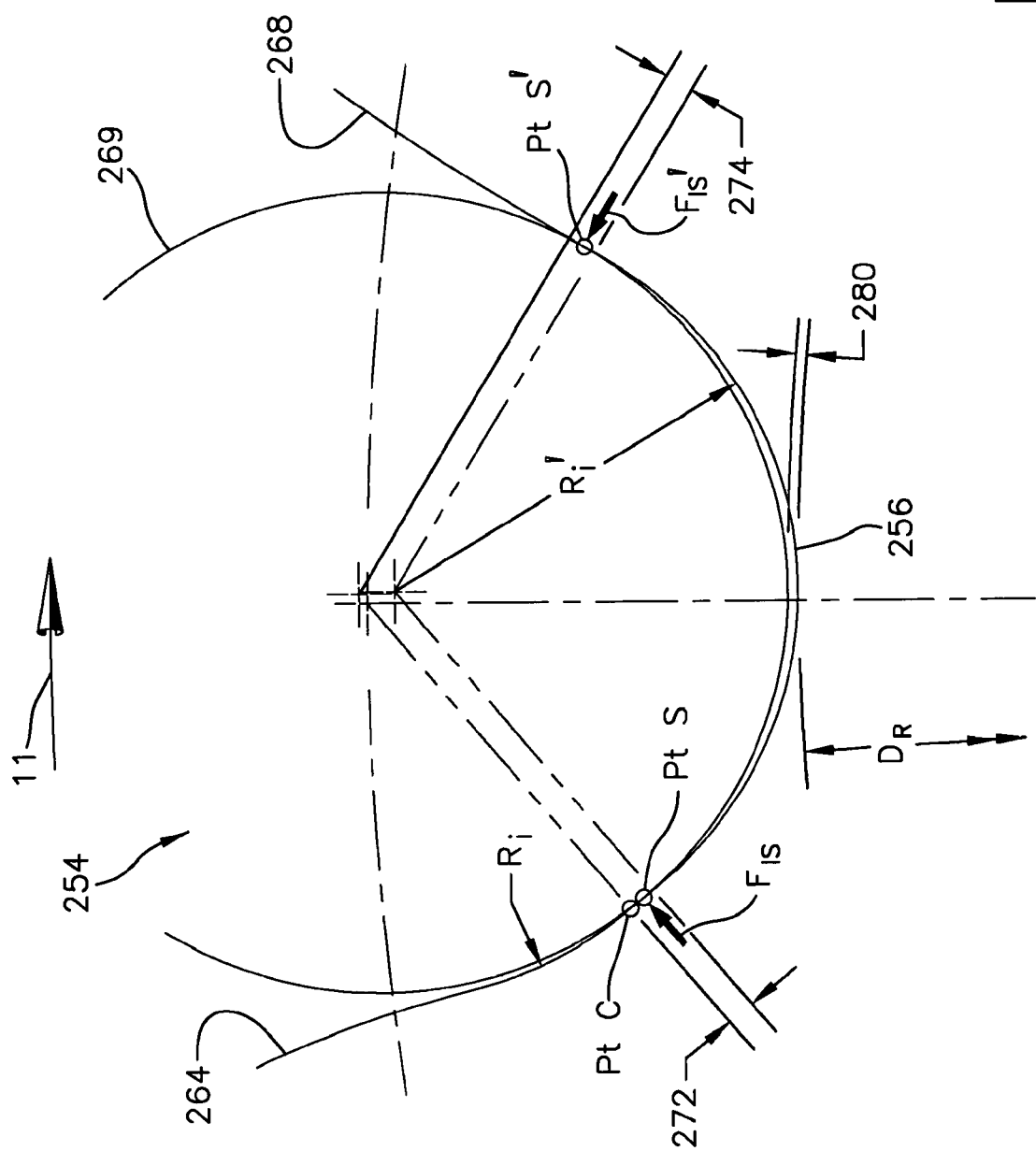
FIG. 9c is an enlarged partial view of the first asymmetrical tooth space profile of FIG. 9 showing a roller seated at the lower flank Points S and S.

Referring now to FIGS. 9 through 9c, the sprocket 212 includes a first tooth 262 having an engaging side or flank 264, and a second tooth 266 having a disengaging side or flank 268. The engaging flank 264 and disengaging flank 268 cooperate to define one of the tooth spaces 254 for receiving a roller associated with the chain 216, such as roller 269. Thus, the sprocket tooth 262 is necessarily classified as one of the teeth 250, and the sprocket tooth 266 can be classified as either one of the sprocket teeth 250 or 252.

The engaging roller 269 has a roller diameter $D_1$, and is shown fully seated in two-point contact within the tooth space 254. More particularly, the engaging roller 269 contacts two lines or ridges B and C that extend axially along the engaging flank surface or face (i.e. in a direction orthogonal to the plane of the drawings) when fully seated in driving contact within the tooth space 254. However, to facilitate a description thereof, the lines or ridges B and C are hereafter shown and referred to as contact points within the tooth space.

The engaging flank 264 has a radius $R_f$ that is tangent to a radially outer end of a flank flat 270. A first portion of the root surface 256, defined by radius $R_i$, is tangent to a radially inner end of the flank flat 270 at one end thereof, and tangent to a radially outer end of a first non-functional flat surface (not shown) that extends radially outward from Point C, at the other end thereof. As best shown in FIG. 9a, a maximum value for the root radius $R_i$ must be equal to, or less than, a minimum roller radius $0.5\ D_1$ in order to insure that two-point/line contact occurs at Points B and C. As a result of $R_i \leq 0.5\ D_1$, a small clearance 273 is defined between the root surface 256 and the roller 269 when the roller is seated at Points B and C.

A second non-functional flat surface (not shown) extends between Point B and a radially outer end of the root surface portion defined by radius $R_i$. The second non-functional flat surface is contiguous with the flank flat 270. That is, a first portion of the flank flat 270 extends radially outward from Point B to facilitate "staged" roller-sprocket meshing. A second, non-functional, portion of the flank flat 270 extends radially inward of Point B and cooperates with the first non-functional flat surface extending radially outward from Point C to facilitate the roller seating in two-point contact at Points B and C.

Referring again to FIG. 9, the location of the flank flat 270 is determined by the angle β, with the flat orientation being normal or perpendicular to a line that passes through Point B and the center (Point X) of roller 269 when the roller is contacting the sprocket at Points B and C. The length of the flank flat portion that extends radially outward from Point B affects a time delay between an initial tangential impact between sprocket 212 and roller 269 at the first contact Point A along the flank flat 270, and a subsequent radial impact at Point C. It should be appreciated that the pressure angle γ (described further below), the amount of pitch mismatch between the chain and the sprocket, and the length of the flank flat can be varied to achieve a desired initial roller contact Point A at the onset of roller-sprocket meshing. It should also be appreciated that, under theoretical conditions, initial roller-sprocket contact occurs at Point B. However, for all other pitch mismatch conditions, the initial contact occurs at Point A, which is offset from Point B. Thus, for all but the theoretical condition, the initial tangential contact occurs at Point A at the onset of mesh, with its related impact force $F_T$ (FIG. 9b)

The roller 269 is believed to stay in hard contact with the flank flat 270 from Point A to Point B as the sprocket rotation moves the roller into full mesh with subsequent radial contact at Point C. The radial impact force $F_R$ (FIG. 9b) does not occur until the sprocket has rotated sufficiently to bring roller 269 into radial contact at Point C. Thus, the radial impact force $F_R$ occurs at the instant of full mesh. The force vector $F_R$ is shown in solid to indicate the occurrence of the radial impact at Point C, and the tangential impact force vector $F_T$ is shown in outline to indicate the previous occurrence of the tangential impact at Point A.

The taut strand load transfer to the meshing roller is considered to be complete at full mesh. At the instant of the radial collision by roller 269 at Point C, with its resultant radial impact force $F_R$, the tangential impact force of $F_T$ has already occurred and is no longer a factor. The time delay ("staged" engagement) between the tangential and radial roller-sprocket collisions effectively spreads the impact energy occurring during the meshing process over a greater time interval, thereby reducing its contribution to the generated noise level at mesh frequency. Additionally, the present asymmetrical sprocket tooth profile beneficially permits a more gradual taut strand load transfer from a fully engaged roller to a meshing roller as the meshing roller moves from its Point A initial mesh to its full two-point mesh position at Points B and C.

Referring again to FIG. 9, the root surface 256 incorporates root relief. That is, a second flat surface 272 extends radially inward from Point C. A second portion of the root surface 256, defined by the radius $R_i'$, is tangent to a radially inner end of the flat surface 272 and is tangent to a radially inner end of a third flat surface 274. The disengaging flank 268, defined by the radius $R_f'$, is tangent to a radially outer end of the third flat surface 274.

It should be appreciated that the non-functional flat surface extending radially outward from Point C is contiguous with the flat surface 272. That is, a first portion of the flat surface 272 extends radially outward from Point C and cooperates with the second non-functional flat surface extending radially inward from Point B (associated with the flank flat 270) to cause the roller to seat in two-point contact at Points B and C. A second portion of the flat surface 272 extends radially inward of Point C and cooperates with the third flat surface 274 to provide root relief.

A clearance 276 exists between the roller 269 and the relieved root surface 256 when the roller 269 is seated in full mesh at Points B and C. For the root relieved tooth space 254, the roller 269 contacts point B at full mesh when its center is on the theoretical pitch diameter PD. The second root radius $R_i'$ is necessarily equal to, or less than, one-half the diameter $D_1$ of roller 269. FIG. 9b illustrates the roller clearance 278 to the disengaging flank 268 for the full mesh position of the roller 269 at points B and C.

With reference now to FIG. 9c, root relief is defined herein as the clearance 280 that exists between the roller 269 and the relieved root surface 256 when the roller 269 bridges across the root and seats at points S and S' on the opposing engaging and disengaging flanks 264, 268, respectively. Thus, the roller 269 is prevented from contacting the root surface 256 when the sprocket 212 rotates to the point that the roller 269 bridges across the root and seats at points S and S' on the opposing engaging and disengaging flanks 264, 268, respectively. In particular, FIG. 9c illustrates the point at which the roller 269 is moved radially inward from Point C and contacts the lower flanks at Points S and S' during rotation of the sprocket 212 around the sprocket wrap 232 (FIG. 7). It should be appreciated that, as the roller continues to travel around the sprocket wrap, the roller moves outward from Point S' along the disengaging flank 268.

In order for the roller 269 to advance into contact with the lower flanks at Points S and S', the roller must advance from the two-point full mesh position and move radially inward from the pitch circle diameter PD by a radial distance. If under some severe operating conditions, the chain drive dynamics force roller 269 to impact the lower flank surfaces of the tooth space 254, the roller is constrained by the meshing geometry which requires the roller to make its initial tangential contact with the sprocket tooth at Point A, then move to its full two-point mesh position at Points B and C before it can progress forward and radially inward to Points S and S', which also will require further compression of the cushion rings 244 (described further below) as the roller travels a radially inward path.

Figure 3:
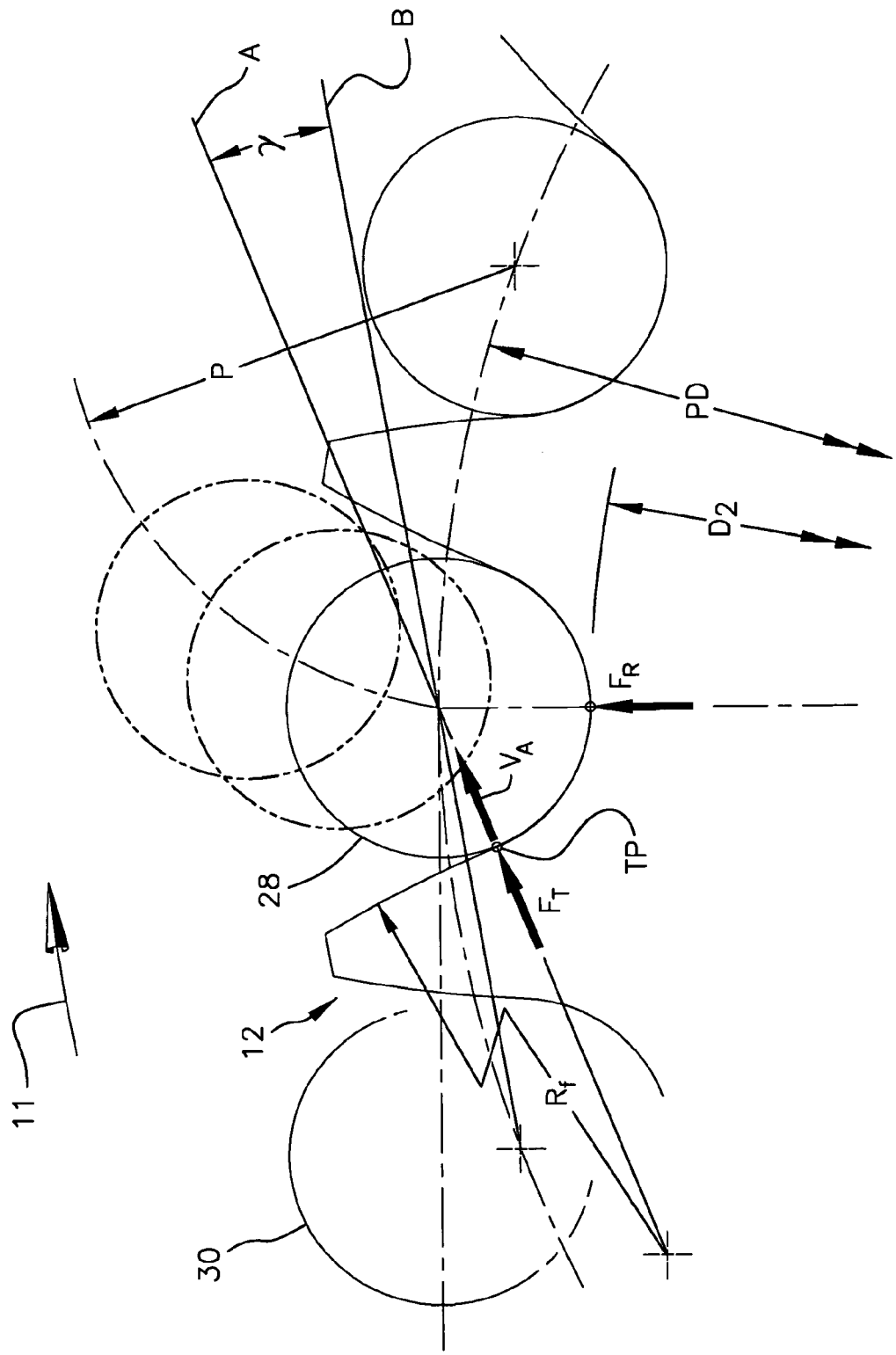
FIG. 3 is an enlarged partial view of the drive sprocket of FIG. 2 showing an engagement path (phantom) and a roller (solid) in a driving position as the drive sprocket rotates in a clockwise direction.
Figure 6:
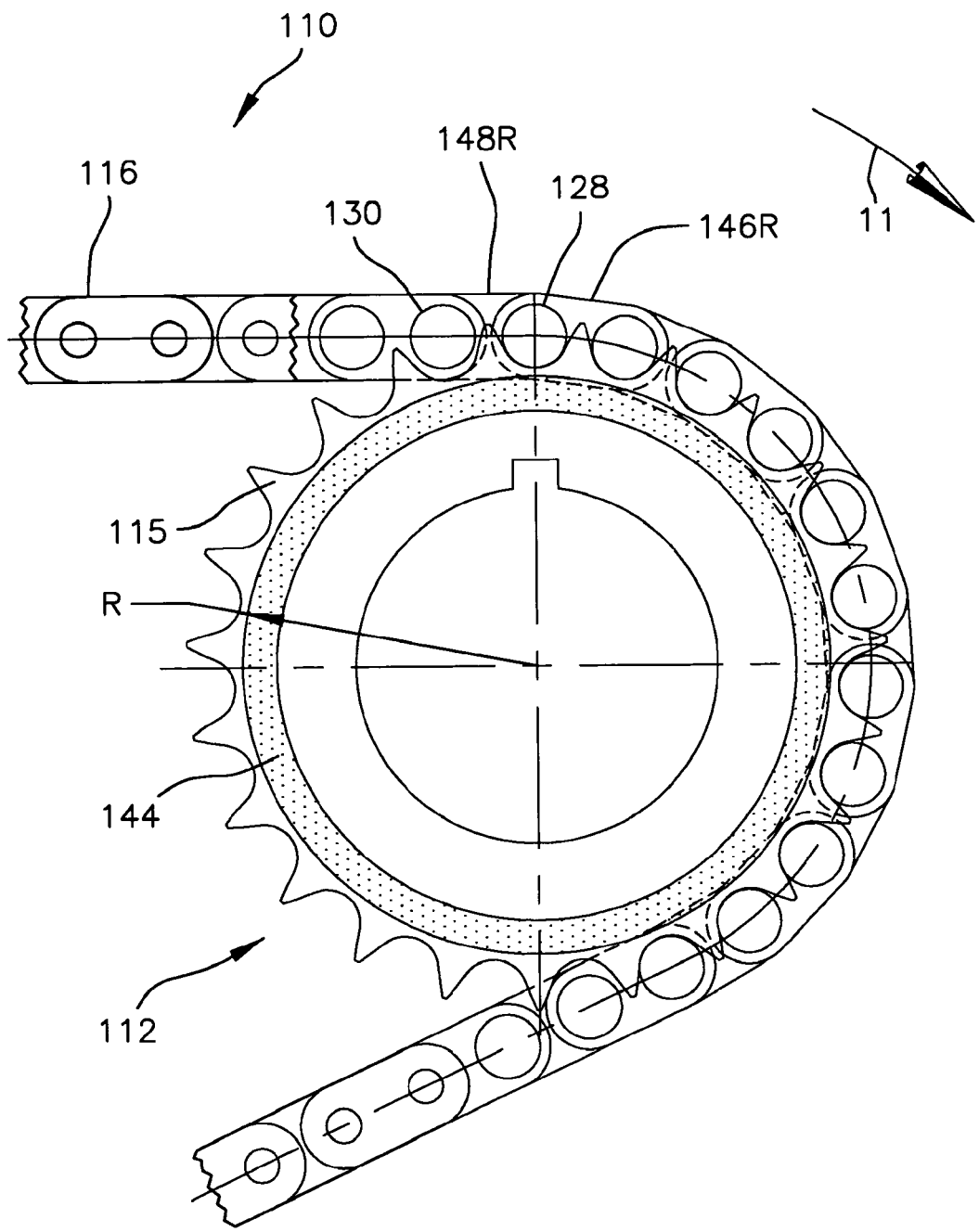
FIG. 6 illustrates an exemplary ISO-606 compliant drive sprocket incorporating a conventional cushion or damper ring on each face thereof.

The meshing geometry for the present asymmetrical tooth profile, along with the favorable roller-sprocket seating geometry at Points S and S', provide a superior noise attenuation to that of the conventional ISO-606 rubber cushion ring system of FIG. 6. The impact vectors $F_{IS}$ and $F_{IS}'$ (FIG. 9c) occur sequentially following the initial tangential contact and subsequent two-point seating. The ISO-606 radial (root) impact vector $F_R$ (FIG. 3), on the other hand, is believed to be the initial roller-sprocket impact before the roller then moves into driving position on the engaging flank.

The engaging flank roller seating angle $\beta$ (FIG. 9) and a disengaging flank roller seating angle $\beta'$ replace the ISO-606 roller seating angle $\alpha$. The pressure angle $\gamma'$ is a function of the engaging flank roller seating angle $\beta$. That is, as $\beta$ increases, $\gamma$ decreases. A minimum asymmetrical pressure angle can be determined from the following equation, where:

$$\gamma_{min} = \beta_{max} - (\alpha_{max}/2 + \gamma_{ISO\ min})$$

Therefore, an asymmetrical pressure angle $\gamma_{min} = 0$ when $\beta_{max} = (\alpha_{max}/2 + \gamma_{ISO\ min})$ as illustrated in the Table of FIG. 5. FIG. 5 lists the maximum Beta ($\beta$) angles and the corresponding pressure angles ($\gamma$) for several sprocket sizes and several asymmetrical profiles. It should be appreciated that reducing the engaging flank pressure angle $\gamma$ reduces the tangential impact force component $F_T$ (FIG. 9b) and thus the tangential impact noise contribution to the overall noise level at the onset of engagement.

The impact force $F_T$ is a function of the impact velocity which in turn is related to pressure angle $\gamma$. As pressure angle $\gamma$ is reduced, it provides a corresponding reduction in the impact velocity between the chain and the sprocket at the onset of meshing resulting in improved NVH characteristics. A minimum pressure angle $\gamma$ also facilitates a greater separation or distance between tangential contact points A and B to further increase or maximize engagement "staging". In the preferred embodiment, the engaging flank pressure angle $\gamma$ is in the range of about −3.0° to about +8° to optimize the staged impact between the roller and the sprocket.

In the embodiment being described, roller seating angle $\beta$ is greater than ISO $\alpha_{max}/2$ at a maximum material condition and $\beta$ can be adjusted until a desired engaging flank pressure angle $\gamma$ is achieved. For instance, the roller seating angle $\beta$ can provide a pressure angle $\gamma$ that is less than zero, or a negative value. It is believed that a small negative pressure angle for the theoretical chain/sprocket interface beneficially provides a pressure angle $\gamma$ closer to zero (0) for a "nominal" system or for a system with wear. However, the engaging flank roller seating angle $\beta$ may be beneficially adjusted so as to provide any engaging flank pressure angle $\gamma$ having a value less than the minimum ISO-606 pressure angle.

It should be noted that chordal pitch reduction may be required when the pressure angle $\gamma$ has a negative value. Otherwise, a roller would interfere with the engaging flank (with a maximum material sprocket and a theoretical pitch [shortest] chain) as it exits the sprocket wrap back into the span. Also, the reduced chordal pitch assists the staged mesh as previously mentioned.

In addition, the disengaging flank roller seating angle $\beta'$ (FIG. 9) may be adjusted to have a maximum value which is equal to $\alpha_{min}/2$ or even less. This reduced seating angle $\beta'$ promotes faster separation when the roller leaves the sprocket and enters the span. This reduced angle $\beta'$ also allows for the roller in a worn chain to ride up the coast flank surface to a less severe angle as the roller moves around the sprocket in the wrap.

Figure 10:
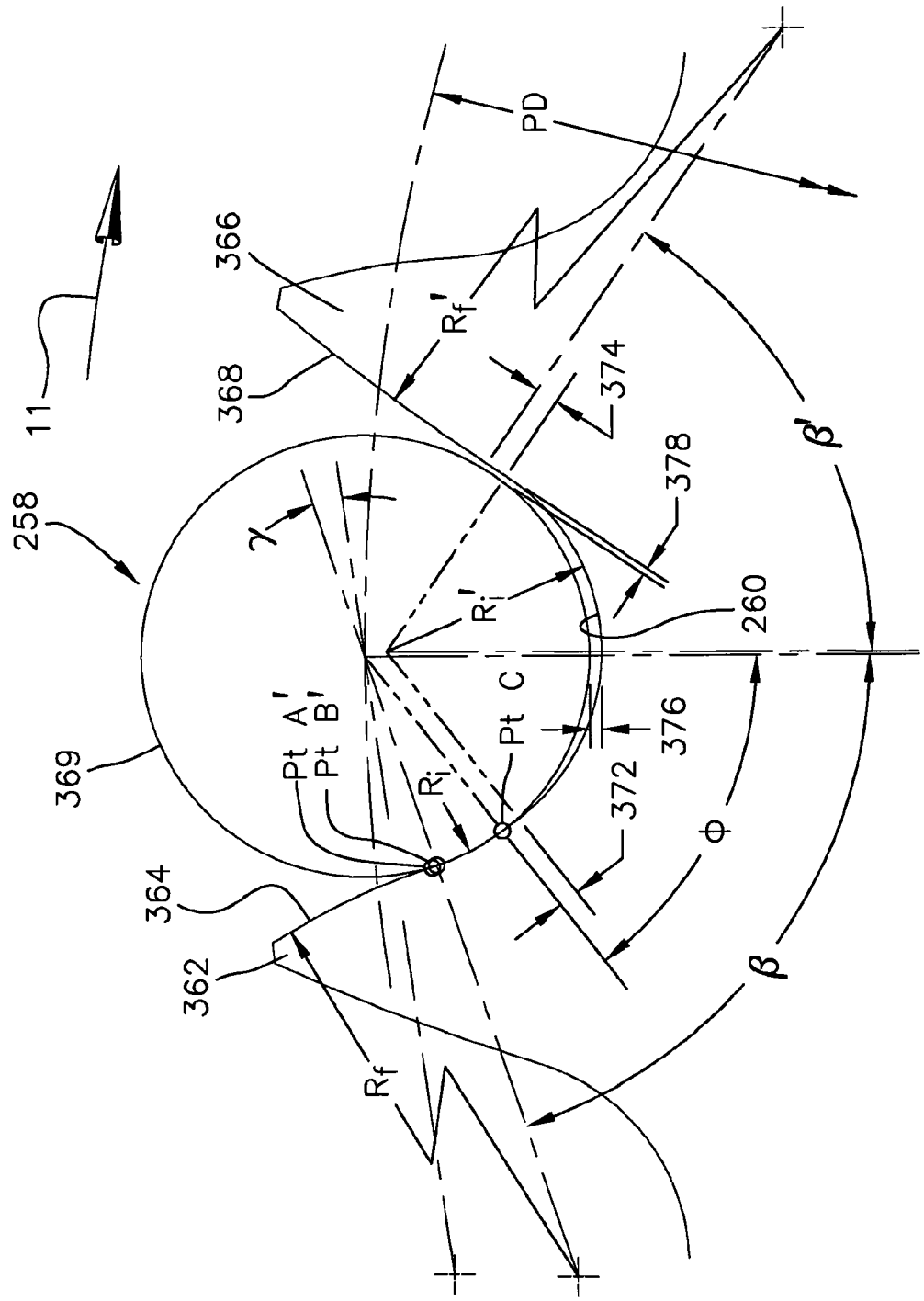
FIG. 10 illustrates a second asymmetrical tooth space profile for the sprocket of FIG. 8.

Referring now to FIG. 10, the sprocket 212 also includes a third tooth 362 having an engaging side or flank 364, and a fourth tooth 366 having a disengaging side or flank 368. The engaging flank 364 and disengaging flank 368 cooperate to define one of the tooth spaces 258 for receiving a roller associated with the chain 216, such as roller 369. Thus, the sprocket tooth 362 is necessarily classified as one of the numbered sprocket teeth 252 (FIG. 8), and the sprocket tooth 366 can be classified as either one of the sprocket teeth 250 or 252.

The engaging roller 369 has a roller diameter $D_1$, and is shown fully seated in two-point contact within the tooth space 258. The engaging roller 369 initially contacts the engaging flank 364 at point A' before fully seating in the tooth space at points B' and C. As described above with respect to the asymmetrical tooth space 254, contact points B' and C are actually lines that extend axially along each sprocket tooth surface (i.e., in a direction orthogonal to the plane of the drawings).

The engaging flank 364 has a radius $R_f$ which is tangent to a first non-functional flat surface (not shown) at contact point B'. The flat surface, which functions only to facilitate two-point roller contact, extends radially inward from point B'. A first portion of the root surface 260 defined by radius $R_i$ is tangent to a radially inner end of the first non-functional flank surface at one end thereof, and tangent to a radially outer end of a second non-functional flat surface (not shown) that extends radially outward from Point C, at the other end thereof. More particularly, a maximum value for the root radius $R_i$ must be equal to, or less than, a minimum roller radius 0.5 $D_1$ in order to insure two-point/line contact at Points B' and C. As a result of $R_i \leq 0.5\ D_1$, a small clearance (corresponding to the clearance 273 shown in FIG. 9a) is defined between the root surface 260 and the roller 369 when the roller is seated at Points B' and C.

The location of the first non-functional flat surface is determined by the angle $\beta$, with the flat orientation being normal or perpendicular to a line that passes through Point B' and the center of roller 369 when the roller is contacting the sprocket at Points B' and C. It should be appreciated that the pressure angle $\gamma$, and the amount of pitch mismatch between the chain and the sprocket, can be varied to achieve a desired initial roller contact Point A' at the onset of roller-sprocket meshing. Under theoretical conditions initial roller-sprocket contact occurs at Point B'. However, for all other pitch mismatch conditions, the initial contact occurs at Point A', which is shown to be offset from Point B'.

Thus, for all but the theoretical condition, the initial tangential contact occurs at Point A' at the onset of mesh. The roller 369 is believed to stay in hard contact as the sprocket rotation moves the roller from its initial tangential impact at Point A' into full mesh position at Point B' with its resulting radial contact at Point C. The radial impact force does not occur until the sprocket has rotated sufficiently to bring roller 369 into radial contact at Point C.

Thus, the radial impact force $F_R$ occurs at the instant of full mesh. The taut strand load transfer to the meshing roller is considered to be complete at full mesh. At the instant of the radial collision by roller 369 at Point C, with its resultant radial impact force, the tangential impact force has already occurred and is no longer a factor. The time delay ("staged" engagement) between the tangential and radial roller-sprocket collisions effectively spreads the impact energy occurring during the meshing process over a greater time interval, thereby reducing its contribution to the generated noise level at mesh frequency. Additionally, the asymmetrical sprocket tooth profile beneficially permits a more gradual taut strand load transfer from a fully engaged roller to a meshing roller as the meshing roller moves from its Point A' initial mesh to its full two-point mesh position at Points B' and C.

The root surface 260 incorporates root relief. That is, a second flat surface 372 extends radially inward from Point C. A second portion of the root surface 260, defined by the radius $R_i'$, is tangent to a radially inner end of the flat surface 372 and is tangent to a radially inner end of a third flat surface 374. The disengaging flank, defined by the radius $R_f'$, is tangent to a radially outer end of the third flat surface 374.

It should be appreciated that the second non-functional flat surface (extending radially outward of Point C) is contiguous with the flat surface 372. That is, a first portion of the flat surface 372 extends radially outward from Point C and cooperates with the first non-functional flat surface extending radially inward from Point B to facilitate the roller seating in two-point contact at Points B' and C. A second portion of the flat surface 372 extends radially inward of Point C and cooperates with the third flat surface to provide root relief.

As indicated above, a clearance 376 exists between the roller 369 and the relieved root surface 260 when the roller 369 is seated in full mesh at Points B' and C. For the root relieved tooth space 258, the roller 369 contacts point B' at full mesh when its center is on the theoretical pitch diameter PD. The second root radius $R_i'$ is necessarily equal to, or less than, one-half the diameter of roller 369. FIG. 10 also illustrates the roller clearance 378 to the disengaging flank 368 for the full mesh position of the roller 369 when seated at points B' and C. The tooth space 258 provides root relief in the same manner as the tooth space 254. That is, the roller 369 is prohibited from contacting the root surface 260 when the roller bridges across the root surface and seats at points S and S' (see clearance 280, FIG. 9c). Thus, the roller 369 can contact only the lower engaging and disengaging flanks. It should be appreciated that as the roller continues to travel around the sprocket wrap, the roller moves outward from Point S' along the disengaging flank 368.

Pitch mismatch is inherent in a chain/sprocket interface except at one condition—the theoretical condition which is defined as a chain at its shortest pitch (shortest being theoretical pitch) and a maximum material sprocket. This theoretical condition therefore defines one limit (zero, or no pitch mismatch) of the tolerance range of the pitch mismatch relationship of chain and sprocket. The other limit is defined when a longest "as built" chain is used with a sprocket at minimum material conditions—or in other words, a sprocket having a minimum profile. This limit produces the greatest amount of pitch mismatch. The pitch mismatch range is therefore determined by the part feature tolerances.

Additional pitch mismatch may be introduced to facilitate a greater time delay between the initial tangential (meshing) contact at point A (for the asymmetrical tooth spaces 254) and the initial tangential contact at point A' (for the asymmetrical tooth spaces 258). That is, varying the time at which the initial roller-to-sprocket contact occurs for each tooth space 254, 258 results in reduced mesh frequency noise because the point and rhythm of the initial roller-to-sprocket contacts are altered. The time delay, or modulation, between the roller-to-sprocket contact at points A and A' may be increased by increasing the mismatch between the chain pitch and sprocket pitch. It should be appreciated that the initial contact occurs earlier for the tooth space 254 than for the tooth space 258 primarily because of the β angle difference (refer to FIG. 11) and, to a lesser degree, the flank flat 270 which causes initial contact to occur higher up on the engaging flank of the sprocket teeth 250.

The sprocket chordal pitch is necessarily shorter than the chain pitch to facilitate the staged roller-tooth contact. In addition, chordal pitch reduction also provides roller-to-flank clearance as the roller exits the sprocket wrap back into the strand. Added chordal pitch reduction, when used, is preferably in the range of 0.005-0.050 mm.

Figure 11:
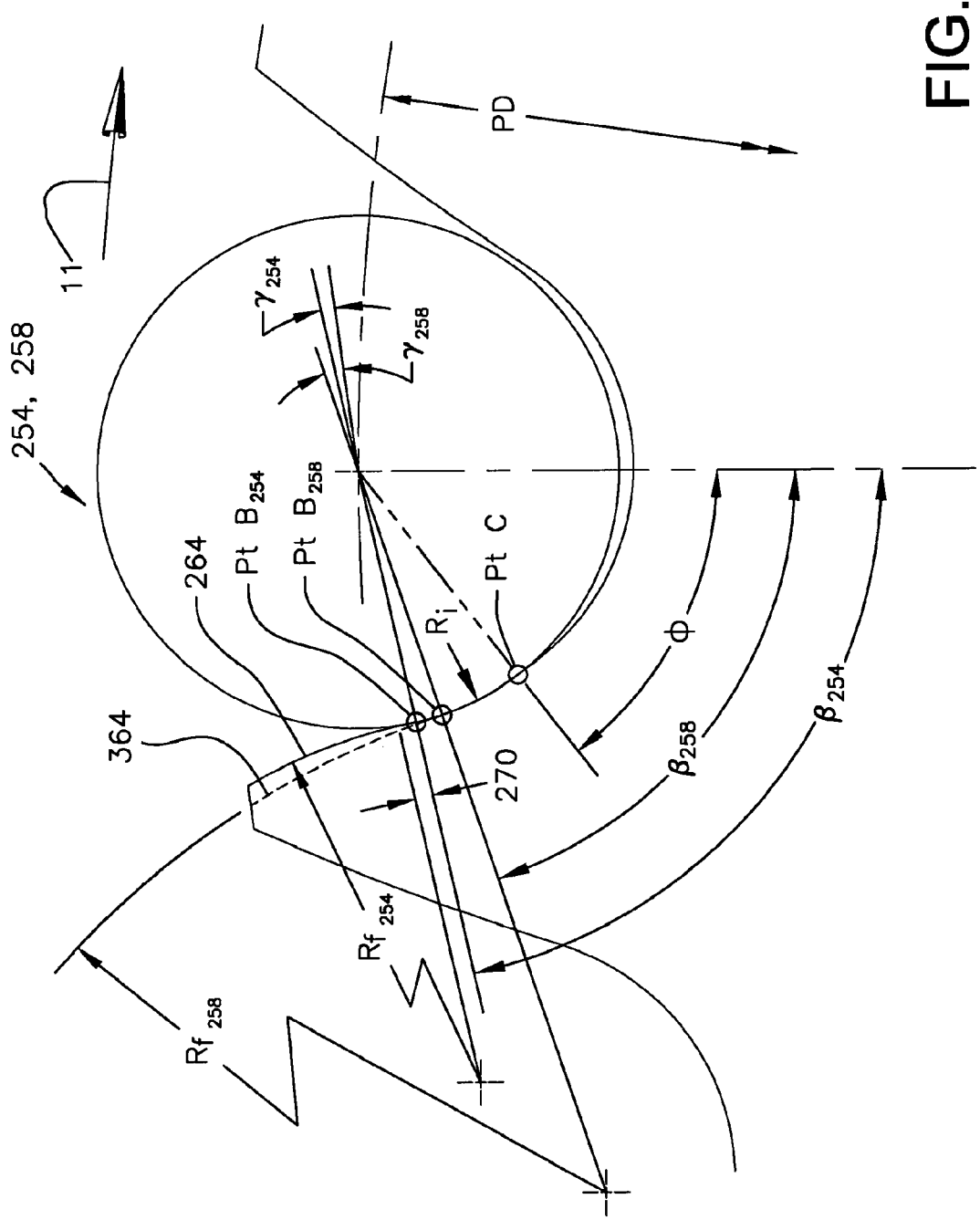
FIG. 11 illustrates the asymmetrical tooth profile of FIG. 9 overlaid with the asymmetrical tooth profile of FIG. 10.

The staged roller contact for each tooth space 254, 258 may be further assisted by providing sprocket tooth pressure angles γ that are substantially less than the ISO standard. Pressure angles γ equal to or very close to zero (0), or even negative pressure angles, are contemplated. For instance, FIG. 11 illustrates one embodiment of the random engagement drive sprocket 212 wherein the pressure angles γ for the tooth spaces 254, 258 are different. That is, both pressure angles γ are either a positive value or zero, but the pressure angle $\gamma_{254}$ for tooth space 254 is smaller than the pressure angle $\gamma_{258}$ for tooth space 258 (and the roller seating angle $\beta_{254}$ is greater than the roller seating angle $\beta_{258}$) Thus, $\gamma_{min}$ may be equal to 0° for the tooth space 254, $\gamma_{min}$ may be equal to +8° for the tooth space 258, and $\gamma_{max}$ for both tooth spaces will always be less than the ISO minimum pressure angle (the feature tolerance band or range for $\gamma_{min}$ and $\gamma_{max}$ is the same for both tooth spaces 254, 258).

As a result, initial roller-to-sprocket contact occurs at point A followed by subsequent radial contact at points B and C for the tooth space 254. And, initial roller-to-sprocket contact occurs at point A' followed by subsequent radial contact at points B' and C for the tooth space 258. The sprocket 212 can incorporate additional chordal pitch reduction, and can incorporate tooth space clearance (TSC), as described in U.S. Pat. No. 5,921,878, the disclosure of which is hereby incorporated by reference for all that it teaches. Tooth space clearance (TSC) enables rollers of a worn chain to be maintained in hard contact with one or more inclined root surfaces of the sprocket teeth. That is, one or more of the flat surfaces 272, 274 (FIG. 9) and 372, 374 (FIG. 10) can be used to compensate for chain pitch elongation or chain wear by accommodating a specified degree of chain pitch elongation ΔP. In addition, the inclined root surfaces facilitate reducing the radial reaction force thereby reducing the roller radial impact noise contribution to the overall noise level. It should be appreciated that a shallow β' angle, in conjunction with tooth space clearance, helps maintain "hard" roller-sprocket contact for the rollers in the wrap.

Alternatively, the pressure angle $\gamma_{min}$ for the tooth spaces 254 may always be a negative value, while the pressure angle $\gamma_{min}$ for the tooth spaces 258 may always be a positive value or zero. For instance, $\gamma_{min}$ may be equal to −30° for the tooth spaces 254, $\gamma_{min}$ may be equal to +8° for the tooth spaces 258, and $\gamma_{max}$ for both profiles will always be less than the ISO minimum pressure angle. With this embodiment, additional chordal pitch reduction will always be included, however, tooth space clearance may or may not be included. In yet another embodiment, the tooth spaces 254, 258 can have the same, or at least substantially the same, pressure angles γ (thus, the tooth spaces have the same or at least substantially the same roller seating angles $\beta_{254}$ and $\beta_{258}$).

Figure 12:
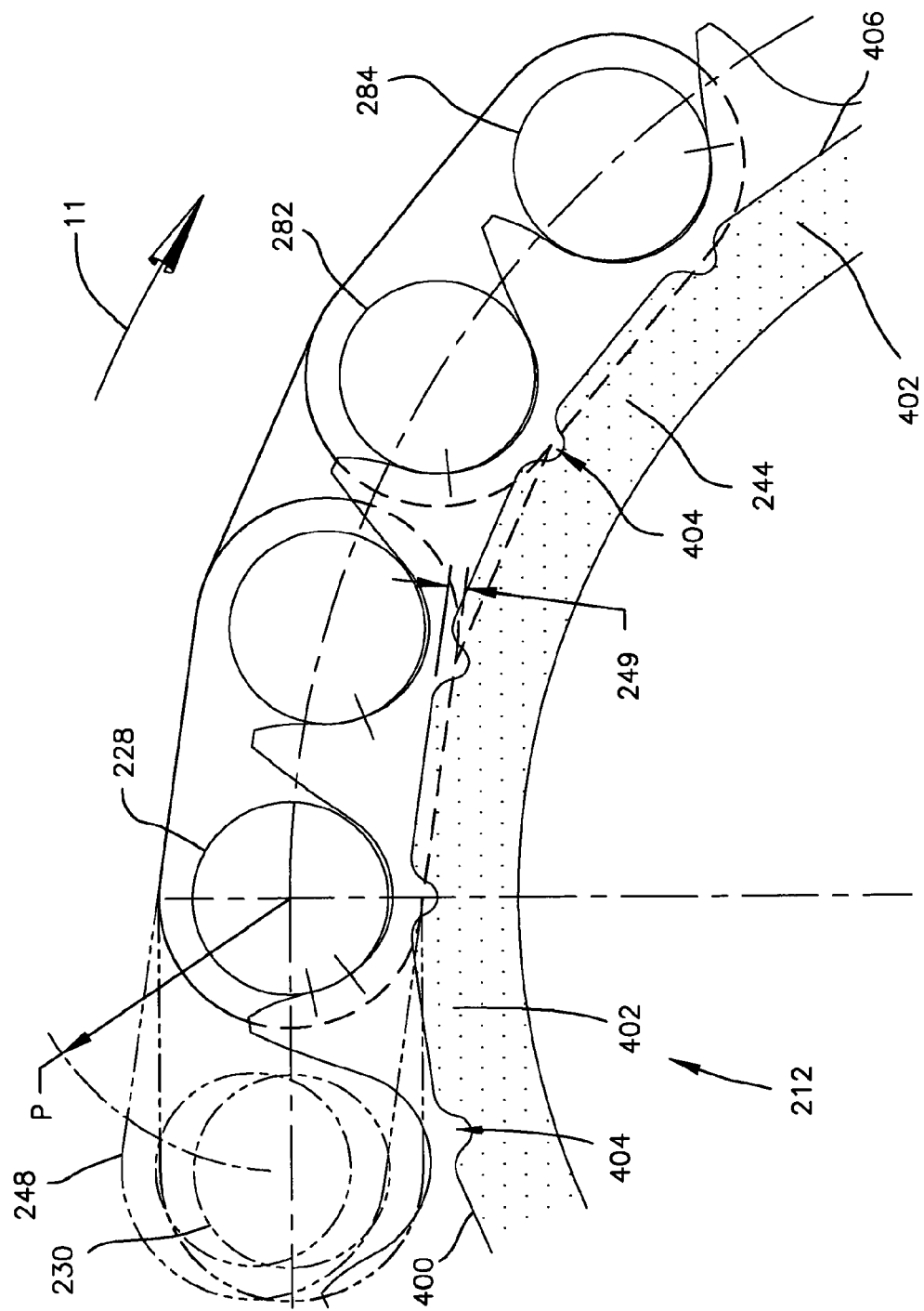
FIG. 12 is an enlarged partial view of the random-engagement roller chain drive sprocket of FIG. 7 at the taut strand-sprocket interface.

FIG. 12 illustrates the path (phantom) that each of the roller link plates, such as roller link plates 248, follow as they come into meshing contact with the sprocket 212. The roller links plates 248 pivot about the center of fully meshed roller 228 and compress the resilient cushion or damping rings 244 that are secured to the hub 213 of the sprocket 212 (see also FIG. 8a) on opposite front and rear faces of the teeth 250 and/or 252 as the roller 230 moves into meshing engagement in the corresponding sprocket tooth space.

Figure 12A:
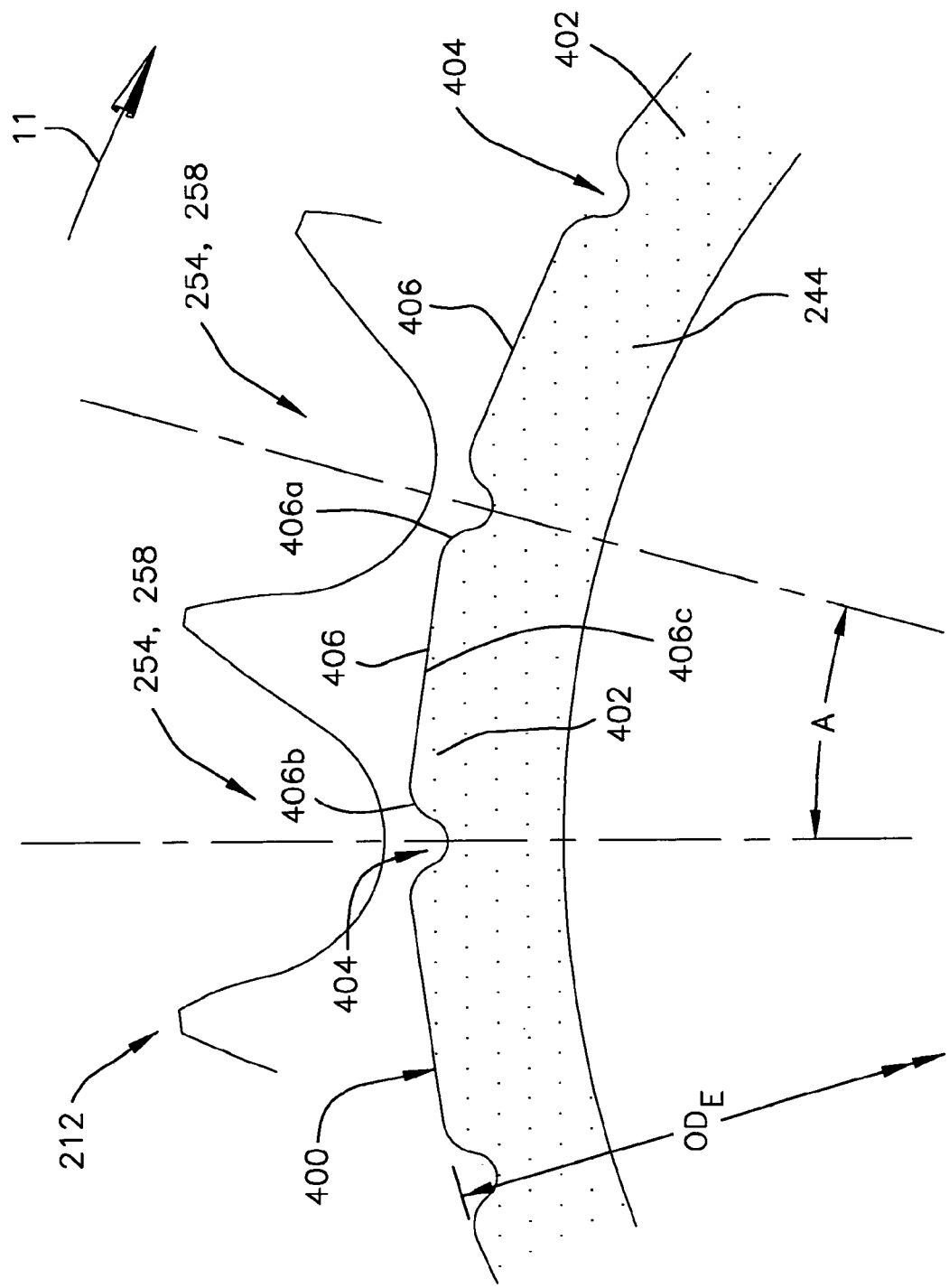
FIG. 12a is an enlarged partial view of the random-engagement roller chain drive sprocket of FIG. 8.

With continuing reference to FIG. 12 and also now to FIG. 12a, the annular elastomeric (e.g., rubber) damping/cushion rings 244 each include an uneven or undulated outer surface 400 formed from alternating compression pads 402 and transverse or axially extending grooves 404. The compression pads 402 each have an outer surface 406 that is arcuate, planar or that otherwise extends generally along an outer diameter $OD_E$ of the cushion rings 244 between a leading or upstream end 406a to a trailing or downstream end 406b. Both the leading end 406a and trailing end 406b of each compression pad 402 are preferably located at a common radial distance from the center or central longitudinal axis CL of the sprocket 212 (see also FIGS. 8, 8a) and, most preferably, both the leading and trailing ends 406a, 406b are located on the outer diameter $OD_E$ of the cushion ring 244. Between the leading and trailing ends 406a, 406b, the outer surface 406 can have any desired shape or configuration, but it is symmetrical about a mid-point 406c that bisects the outer surface 406 of the compression pad 402. Thus, preferably, the cushion ring 244 includes a symmetrical outer surface or outer diameter $OD_E$ as defined by the symmetrical compression pads 406. Also, the outer surface 406, between the leading and trailing ends 406a, 406b thereof, is preferably smooth and either planar or extends smoothly and arcuately along with the outer diameter $OD_E$ of the cushion ring 244.

Thus, the outer surface 406 of each compression pad 402 is defined so that the pad 402 is compressed evenly and uniformly from the leading end 406a to the trailing end 406b by the links 248 of the chain as the roller 230 moves into engagement with the sprocket 212. In other words, with continuing reference to the example illustrated in FIG. 12, the compression gradient of each compression pad 402 is evenly distributed between the seated roller 228 and the next-meshing roller 230.

The grooves 404 located between successive compression pads 402 of each cushion ring 244 extend transversely or axially (i.e., parallel to the central axis CL of the sprocket 212) provide for minimum or no compression of the cushion rings 244 for that portion of the link plates of the roller chain located adjacent the seated and pivoting roller 228, where compression would provide little or no benefit. Further, the grooves 404 provide voids or spaces into which the elastomeric material forming the trailing ends 406b of the compression pads 402 can move during meshing of each roller and subsequent rotation of that roller through the sprocket wrap 232 (FIG. 7).

Figure 12B:
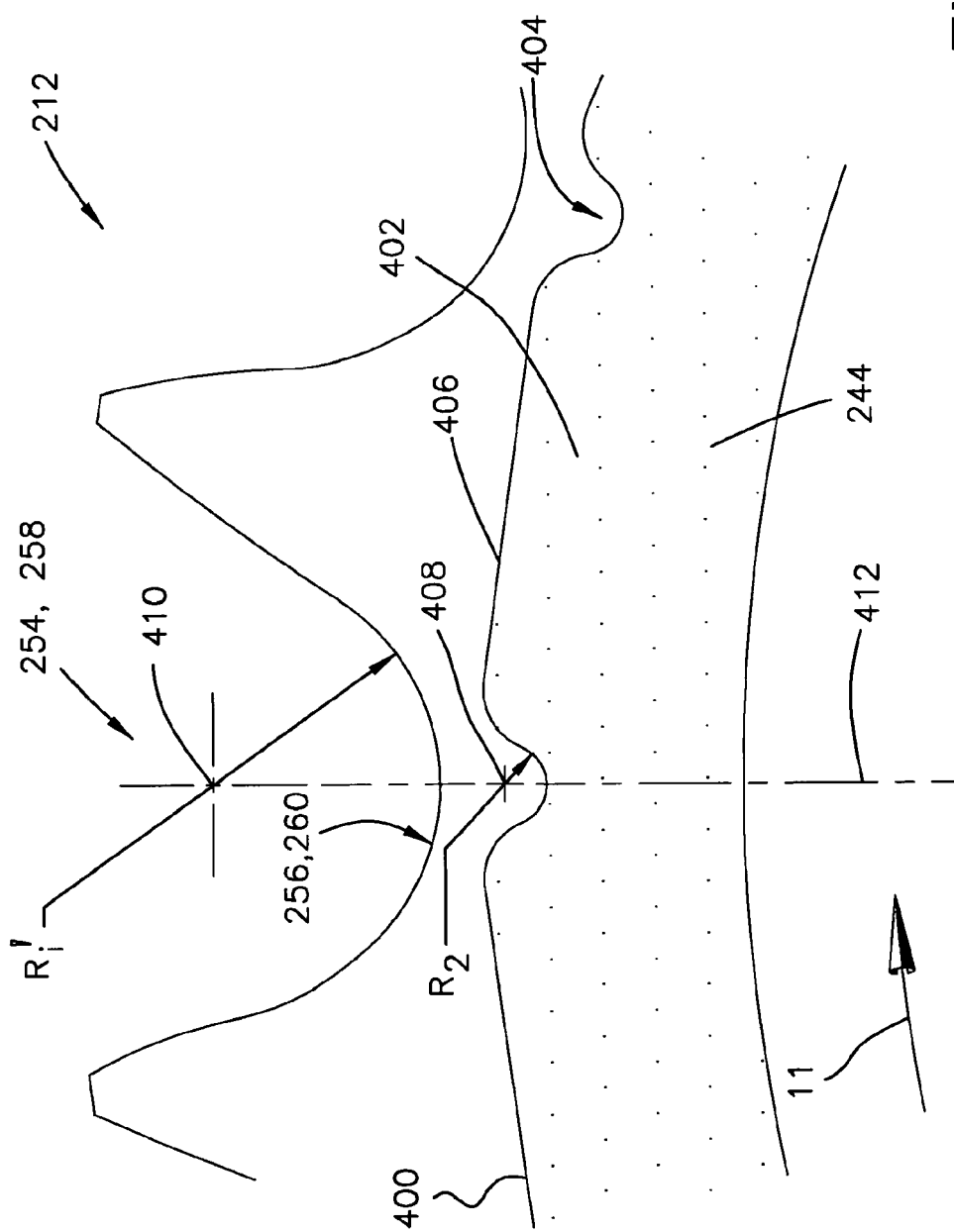
FIG. 12b is an enlarged partial view of the sprocket FIG. 12a illustrating the positional relationship between the sprocket tooth spaces and the cushion ring pads and grooves.

With reference now to FIG. 12b, each groove 404 is defined by at least one radius $R_2$ extending from an arc center 408 of the groove 404 (in the embodiment being described, the grooves 404 are defined by at least two radii). Likewise, a portion of the root surfaces 256, 260 of the tooth spaces 254, 258, respectively, is defined by a radius $R_i'$ that extends from an arc center 410 of the root surface portion defined by the radius $R_i'$.

Thus, in the illustrated example, a radial line 412 can be drawn between the arc center 410, the arc center 408 and the center CL of the sprocket 212. It can be seen that the cushion rings 244, and more particularly, the compression pads 402 and grooves 404, are oriented relative to the sprocket 212 such that the arc centers 408 of the grooves 404 are aligned along the radial line 412. More generally, in accordance with the present invention, each groove 404 of each cushion ring 244 is located radially inward from and circumferentially aligned with one of the tooth spaces 254, 258 of the sprocket 212. Most preferably, each groove 404 is bisected by the radial line 412 that extends from the center CL of the sprocket 212 through the arc center 410. Also, while the grooves 404 illustrated here are defined by a radius such as the radius $R_2$, it is also contemplated that the grooves be otherwise defined or conformed, i.e., the grooves can be defined by one or more planar surfaces and/or other non-planar surfaces.

Figure 12C:
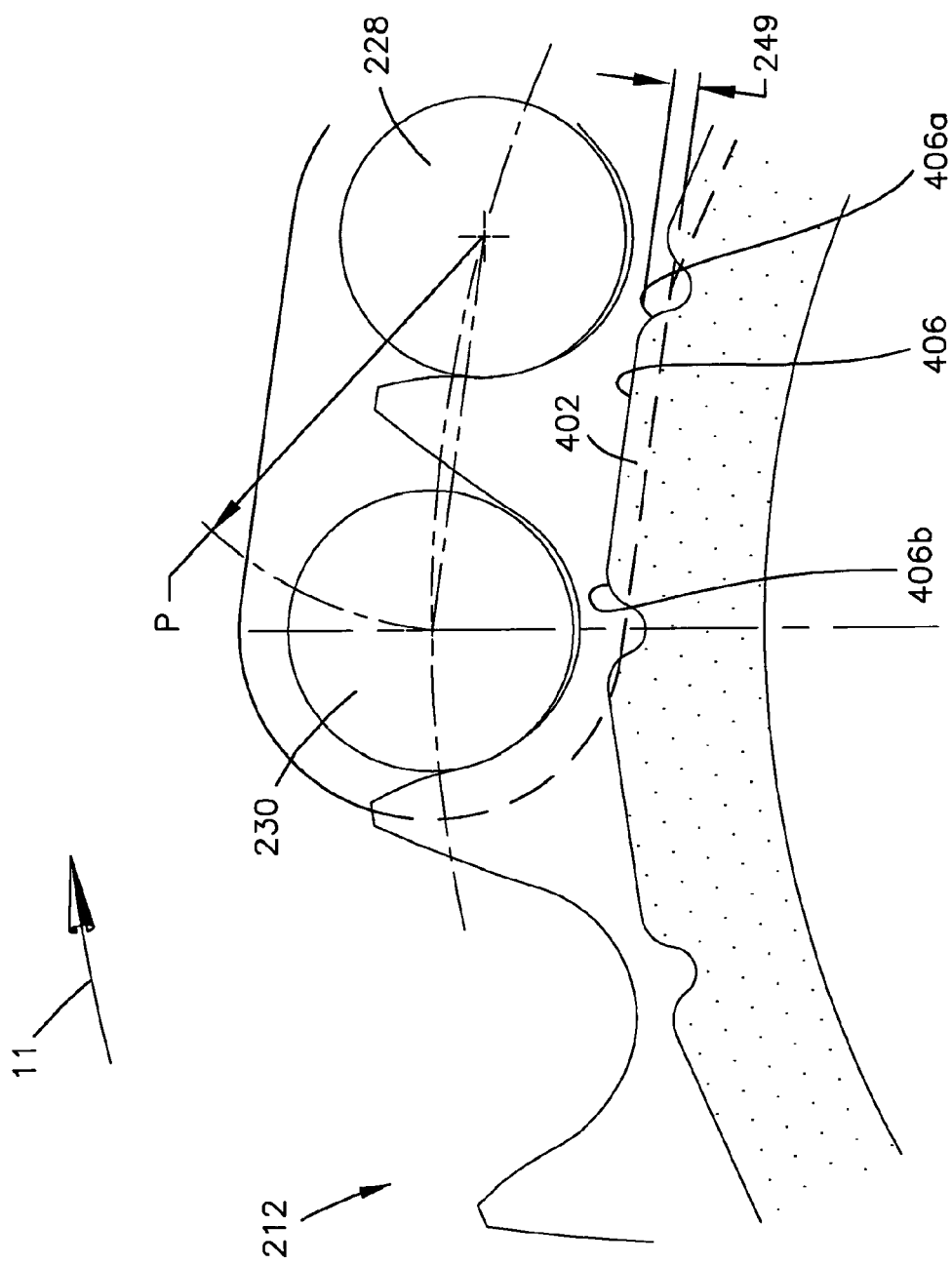
FIG. 12c is an enlarged partial view of the sprocket of FIG. 12.

Referring now to FIG. 12c, the sprocket 212 has been rotated in the clockwise direction 11 (as compared to FIG. 12) until the roller 230 is fully seated in two-point driving contact with the sprocket 212. It can be seen that the outer surface 406 of the compression pad 402 is compressed uniformly by an amount 249 between its leading and trailing ends 406a, 406b when the two consecutive rollers 228, 230 are engaged with the sprocket 212 as shown in FIG. 12c.

Figure 12D:
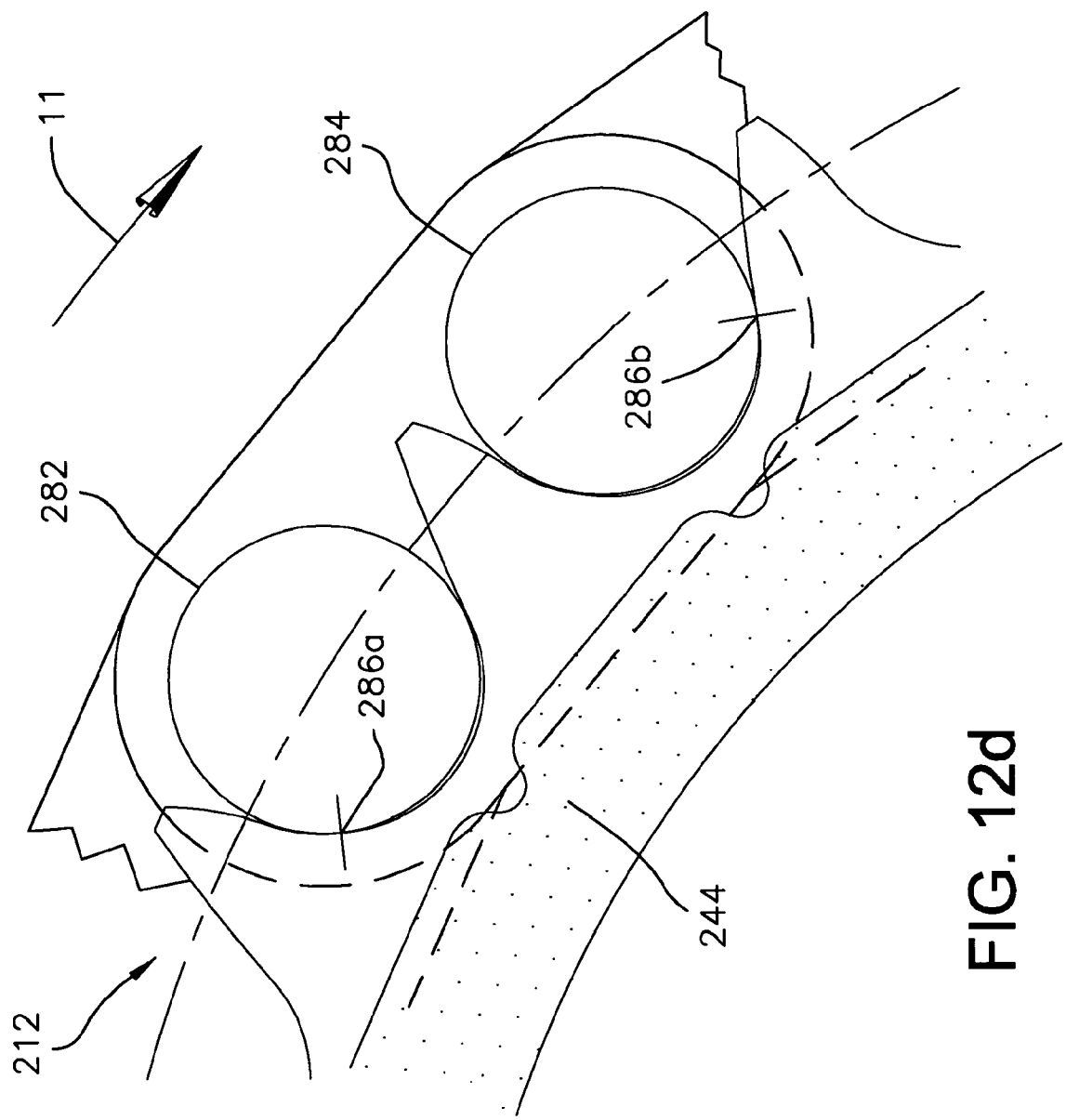
FIG. 12d is an enlarged partial view of the sprocket of FIG. 12.

Referring now to FIG. 12d, roller 282 is shown to be in contact with the engaging tooth flank at the point indicated by the short line 286a normal to the roller and tooth flank. The roller 284 is shown to be in contact with the disengaging tooth flank at the location 286b in the tooth space that it occupies. The forward progression of roller 282, in its angular position shown in FIG. 12d until it contacts the disengaging flank of the adjacent tooth, will take place somewhere between its present position and the angular position currently occupied by roller 284.

Figure 12E:
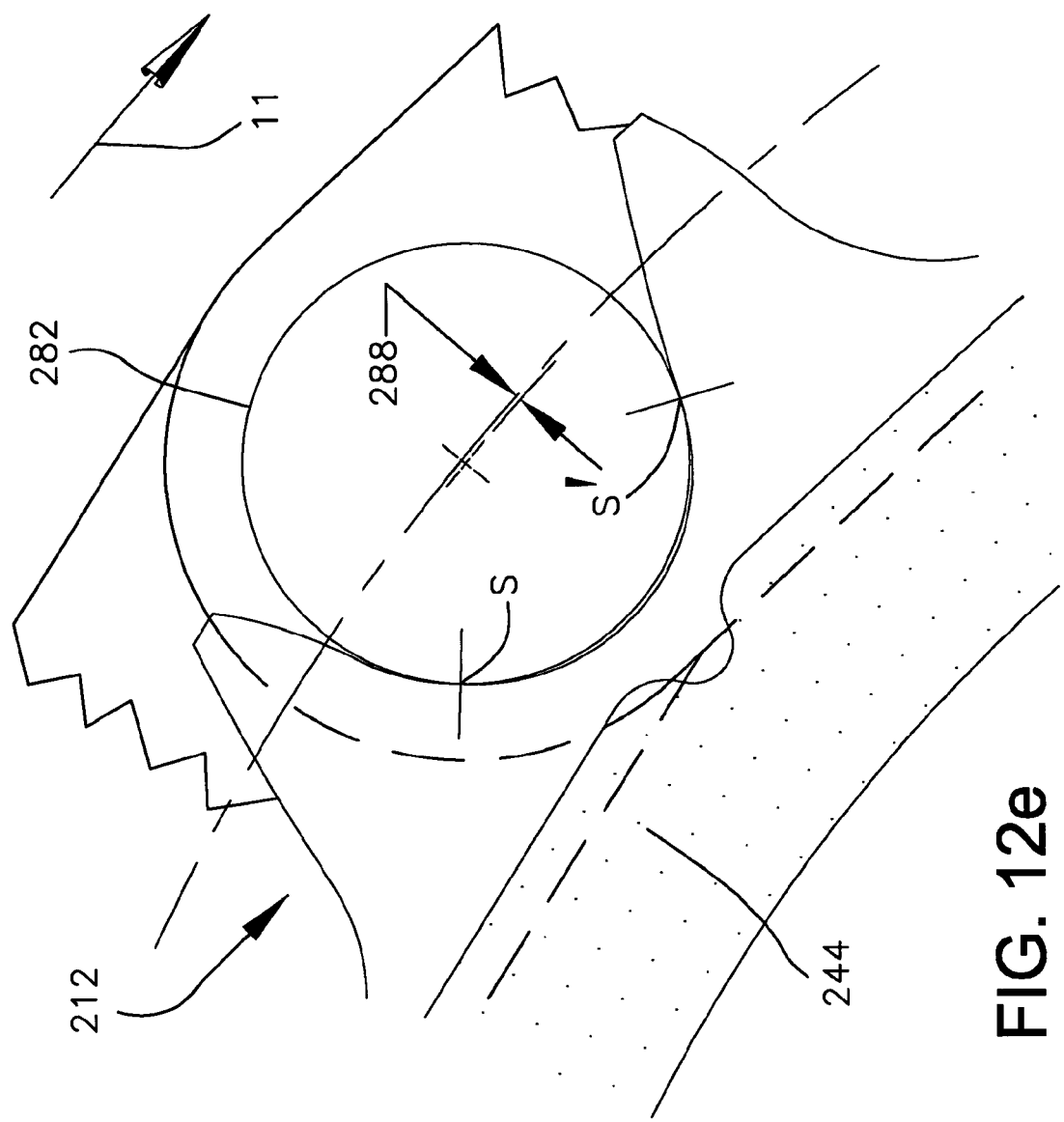
FIG. 12e is an enlarged partial view of the sprocket of FIG. 12d.

FIG. 12e shows sprocket 212 rotated in the direction of arrow 11 through some angle less than tooth angle A until the instant at which roller 282 contacts both flanks as indicated by the lines S, S'. As mentioned previously, to achieve this condition, the roller 282 must move radially inward a distance 288, further compressing the pads of the rubber cushion rings 244, in order for contact to occur at the points S, S' on both flanks. The center of roller 282 may, in fact, stay on the pitch diameter PD as it progresses from the engaging flank contact to the disengaging flank contact. In either case, the cushion rings 244 inhibit the rollers in the sprocket wrap 232 from vibrating as would lead to intermittent contact of the rollers with the sprocket teeth, resulting in generation of undesired broadband noise.

It should be noted that the different sets of sprocket teeth can be arranged in many regular patterns, as opposed to an arbitrary pattern, that would work equally as well. In all cases, the arrangement of two sets of different sprocket teeth on a sprocket provides a means for breaking up the mesh frequency impact noise normally associated with and induced by a full complement of substantially identically shaped sprocket teeth. Mesh frequency noise reduction and broadband noise reduction are achieved by altering the point and rhythm of initial roller-to-sprocket contacts from one tooth profile to the next, and by buffering or softening the engaging impact of the roller as they leave the span and collide with the sprocket during the meshing process.

The above-described random engagement roller chain drive sprocket 212 has two groups of sprocket teeth, each having a different tooth profile that incorporates root relief. However, it is contemplated that only one of the two sets of sprocket teeth be used and/or incorporate root relief. It is also contemplated that only certain ones of the first and/or second plurality of sprocket teeth incorporate root relief.

The crankshaft sprocket, generally the smallest sprocket in the chain drive, is usually the major noise contributor. The typically larger driven camshaft sprocket, however, will also contribute to the generated noise levels, but generally to a lesser extent than the crankshaft sprocket. However, the driven sprocket, particularly if it is nearly the same size or smaller than the driving sprocket, may be the prime noise generator, as in the case with balance shaft sprockets and pump sprockets. Thus, the features of the present invention may also be used advantageously with camshaft or driven sprockets as well.

It should be appreciated that the disclosed asymmetrical tooth profile features can be altered slightly without substantially deviating from the chain and sprocket meshing kinematics that produce the noise reduction advantages of the present invention. For example, the engaging asymmetrical flank profiles can be approximated by an involute form, and the disengaging asymmetrical flank profiles can be approximated by a different involute form. Slight changes to the profile may be done for manufacturing and/or quality control reasons—or simply to improve part dimensioning.

Figure 1:
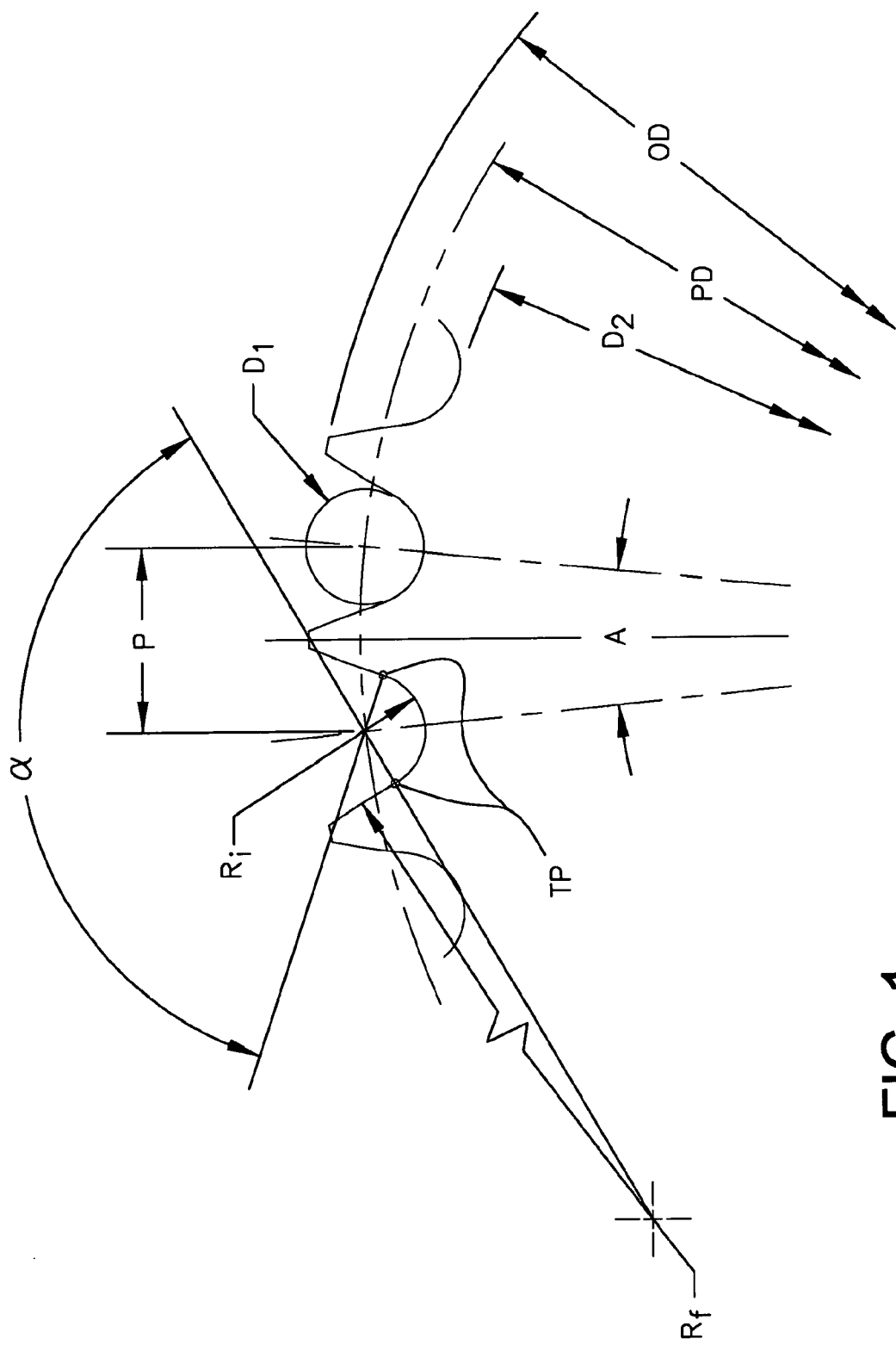
FIG. 1 illustrates a symmetrical tooth space form for an ISO-606 compliant roller chain sprocket.
Figure 2:
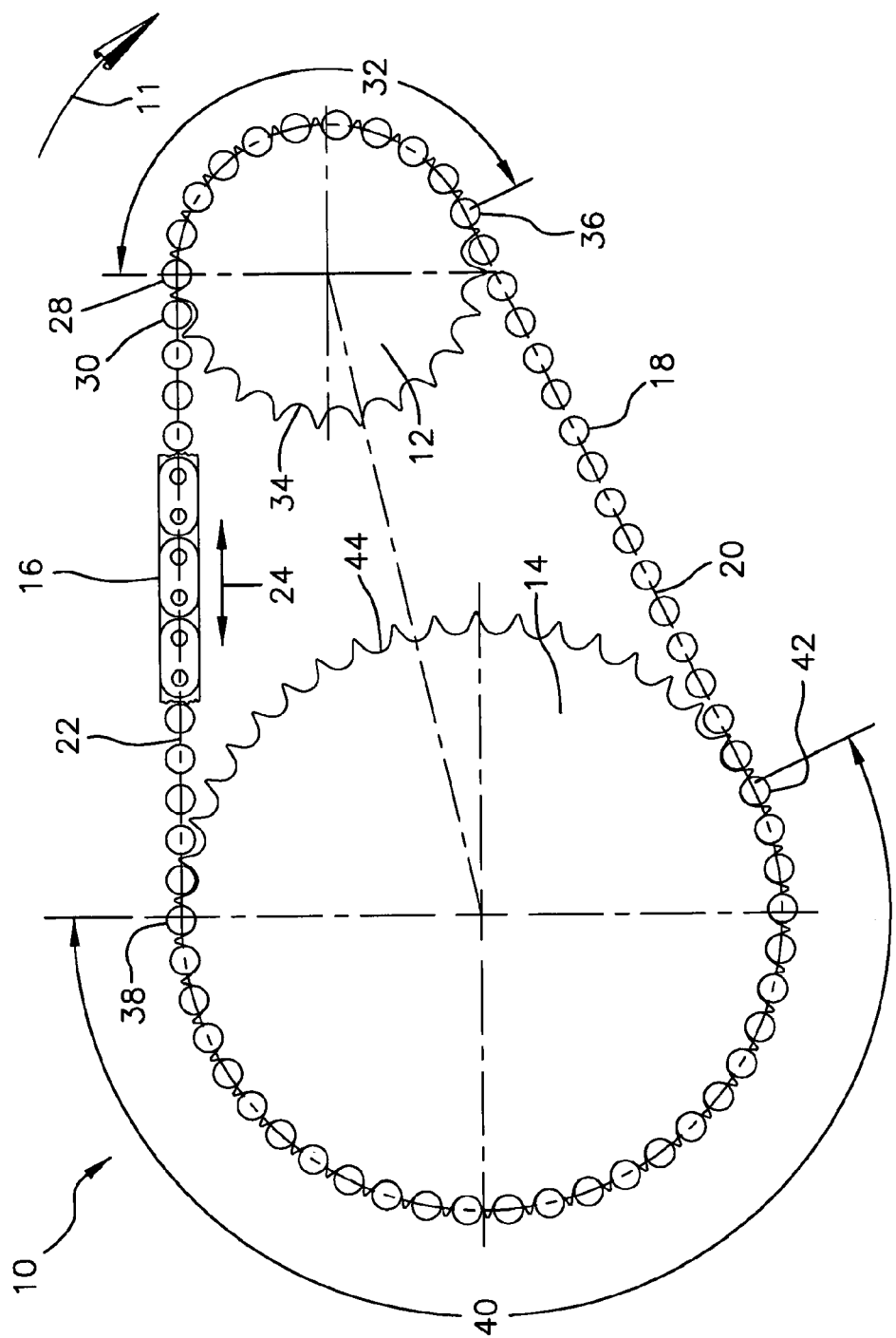
FIG. 2 is an exemplary roller chain drive system having an ISO-606 compliant drive sprocket, driven sprocket, and roller chain.
Figure 6B:
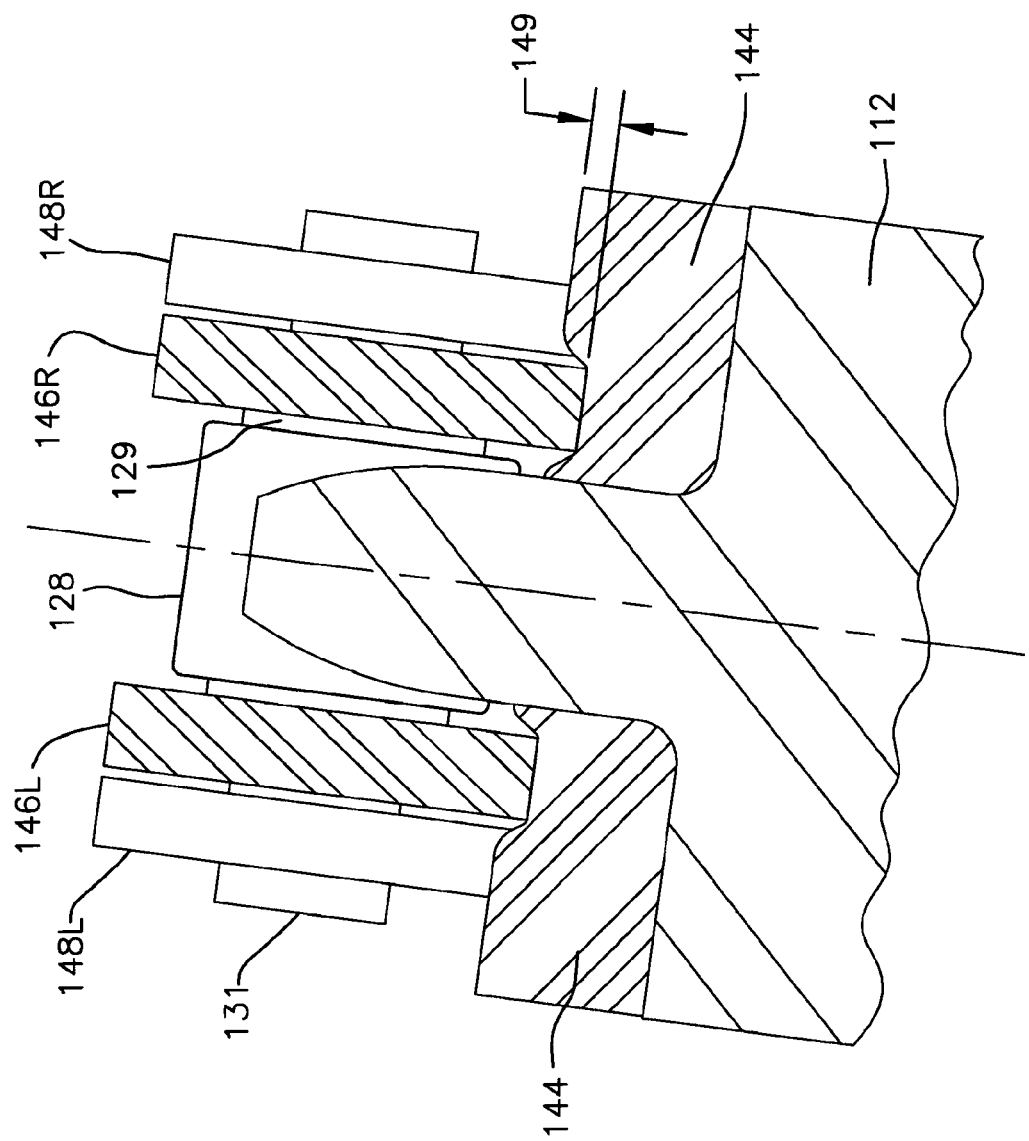
Figure 13A:
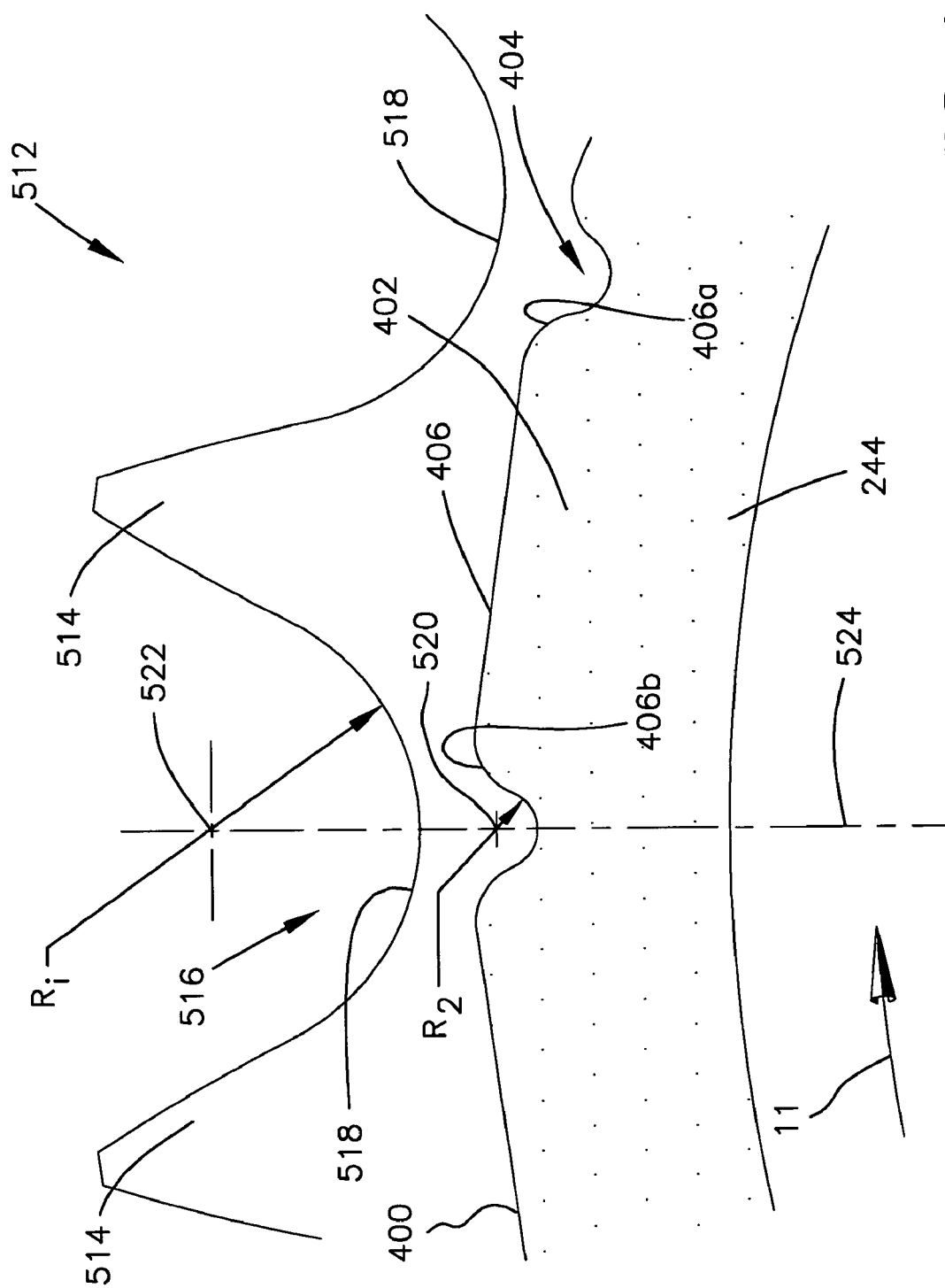
FIG. 13a is an enlarged partial view of an ISO-606 compliant sprocket illustrating the relationship between the ISO-606 compliant sprocket tooth spaces and the cushion ring pads and grooves of the present invention.

It is also contemplated that one or more of the cushion rings 244 of the present invention can be mounted to a known ISO-606 compliant sprocket or any other sprocket with symmetrically formed teeth and tooth spaces, such as the sprocket 12 (FIG. 2), in order to achieve NVH gains over an ISO-606 compliant sprocket incorporating a known cushion ring, such as the cushion ring 144 (FIGS. 6–6b). Referring now to FIG. 13a, an ISO-606 compliant sprocket 512 includes a plurality of symmetrical sprocket teeth 514. Successive adjacent sprocket teeth cooperate to define a symmetrical tooth spaces 516 having root surfaces 518. At least one elastomeric cushion ring 244 is mounted to the sprocket 512. Preferably a cushion ring 244 is mounted adjacent each axial face of the sprocket 512 so that the teeth 514 are located axially between the two cushion rings 244 as described above in relation to the sprocket 212.

In the illustrated embodiment of FIG. 13a, each groove 404 is defined by at least one radius $R_2$ extending from an arc center 520 of the groove 404 (in the embodiment being described, the grooves 404 are defined by at least two radii). Likewise, the root surface 518 of each symmetric tooth space 516 is defined by a radius $R_i$ that extends from an arc center 522 of the root surface defined by the radius $R_i$. A radial line 524 can be drawn between the arc center 522 of the root surface portion defined by the radius $R_i$ and the center (not shown) of the sprocket 512. The cushion ring 244, and more particularly, the compression pads 402 and grooves 404, are preferably oriented relative to the sprocket such that the arc centers 520 of the groove portions defined by the radii $R_2$ are positioned at least proximate the radial lines 524. In this case, a radial line 524 can be drawn at least through a portion of each groove 404. Preferably, the arc centers 520 of the groove portions defined by the radii $R_2$ are positioned on the radial lines 524. In this case, the radial lines 524 bisect the grooves 404. More generally, as noted above, it is preferred that the grooves 404 of the cushion rings 244 be located radially inwardly from and be at least partially circumferentially overlapped by the root surfaces 518, respectively.

Figure 13B:
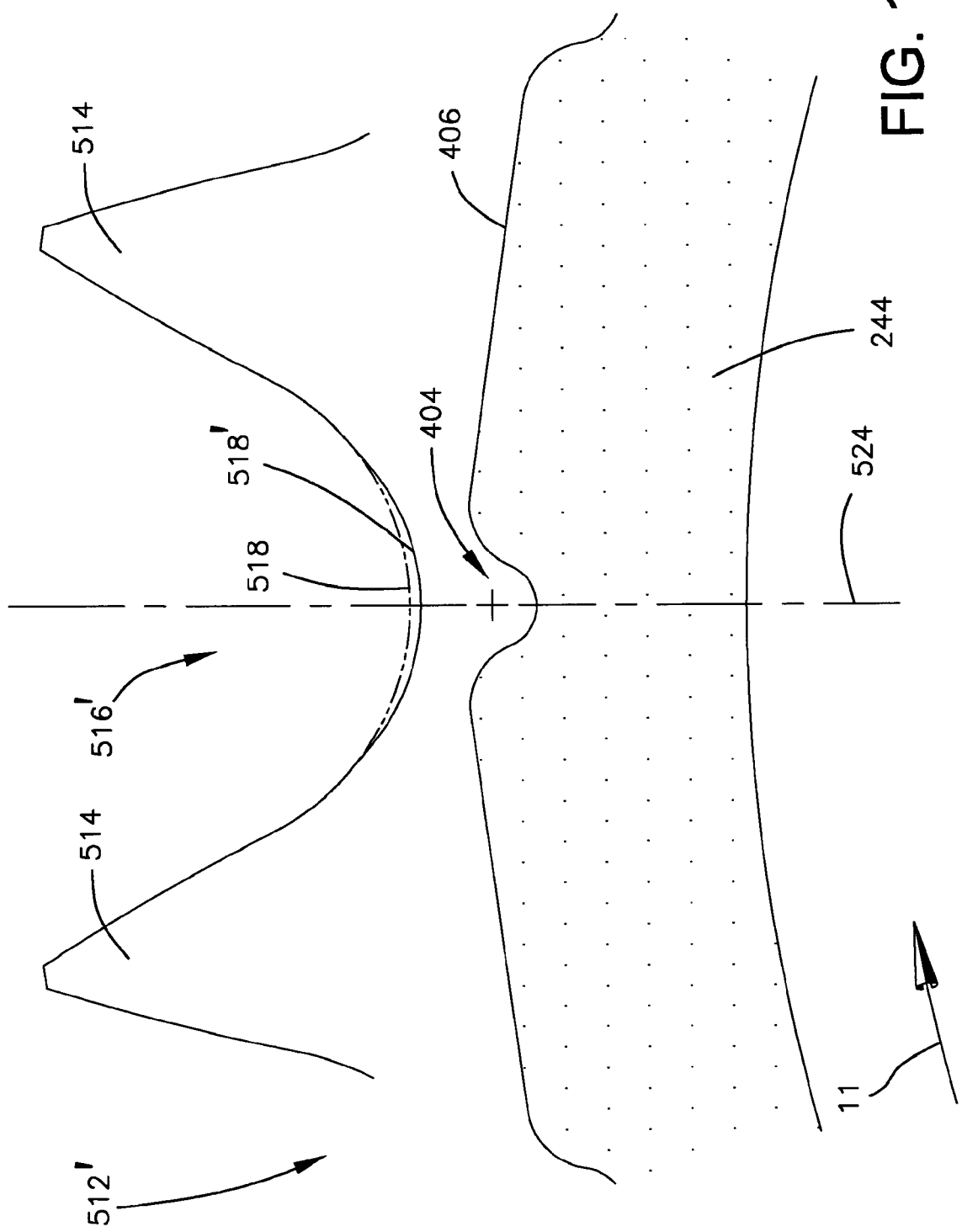
FIG. 13b is an enlarged partial view of an ISO-606 compliant sprocket that incorporates root relief and that includes a cushion ring formed in accordance with the present invention.

FIG. 13b partially illustrates a sprocket 512' including cushion rings 244 in accordance with the present invention. Except as otherwise shown and described, the sprocket 512' and the cushion rings 244 secured thereto are identical to the sprocket 512 just described and illustrated in FIG. 13a. The sprocket 512', however, is slightly modified in that the root surface 518 (shown in phantom) has been relieved so that a relieved root surface 518' defines at least a portion of the root between successive teeth 514. In particular, the relieved root surface 518' is defined so that a roller (see roller R1 in FIG. 14) of the associated roller chain, when fully seated in the tooth space 516', will not contact the relieved root surface 518'. The relieved root surface 518' can be defined be one or more radii and/or by one or more flats, and the shape of the relieved root surface 518', itself, is unimportant in that it never contacts a roller of the roller chain.

The precise location and length of the relieved root surface 518' can be varied without departing from the overall scope and intent of the present invention. It is preferred, as illustrated, that the relieved root surface 518' be symmetrically defined relative to the tooth space 516', i.e., symmetrically defined about the radial line 524 that bisects the tooth space 516', although this is not required. At a minimum, however, it is important that an associated roller, when fully seated in the tooth space 516' be spaced from the sprocket at the center of the tooth space 516'. i.e., at the radial line 524.

With respect to the symmetrical sprockets 512, 512', or any other symmetrical sprockets, symmetrical cushion rings 244 formed in accordance with the present invention provide a significant advantage over known "saw-tooth" cushion rings or other cushion rings having a non-symmetrical outer surface in that the cushion rings 244 can be mounted or insert-molded to either side of the sprocket teeth 514 without being installed backwards. Stated another way, the cushion rings 244 function properly regardless of the direction in which they rotate if they are secured to a symmetric sprocket such as the sprockets 512, 512'. Thus, in a mounting operation, assembly time and errors are reduced, while in an insert molding operation, where the sprocket 512, 512' is placed in an injection mold and the cushion rings molded directly thereto, there is no requirement that the sprocket be placed "right-side-up."

Figure 14:
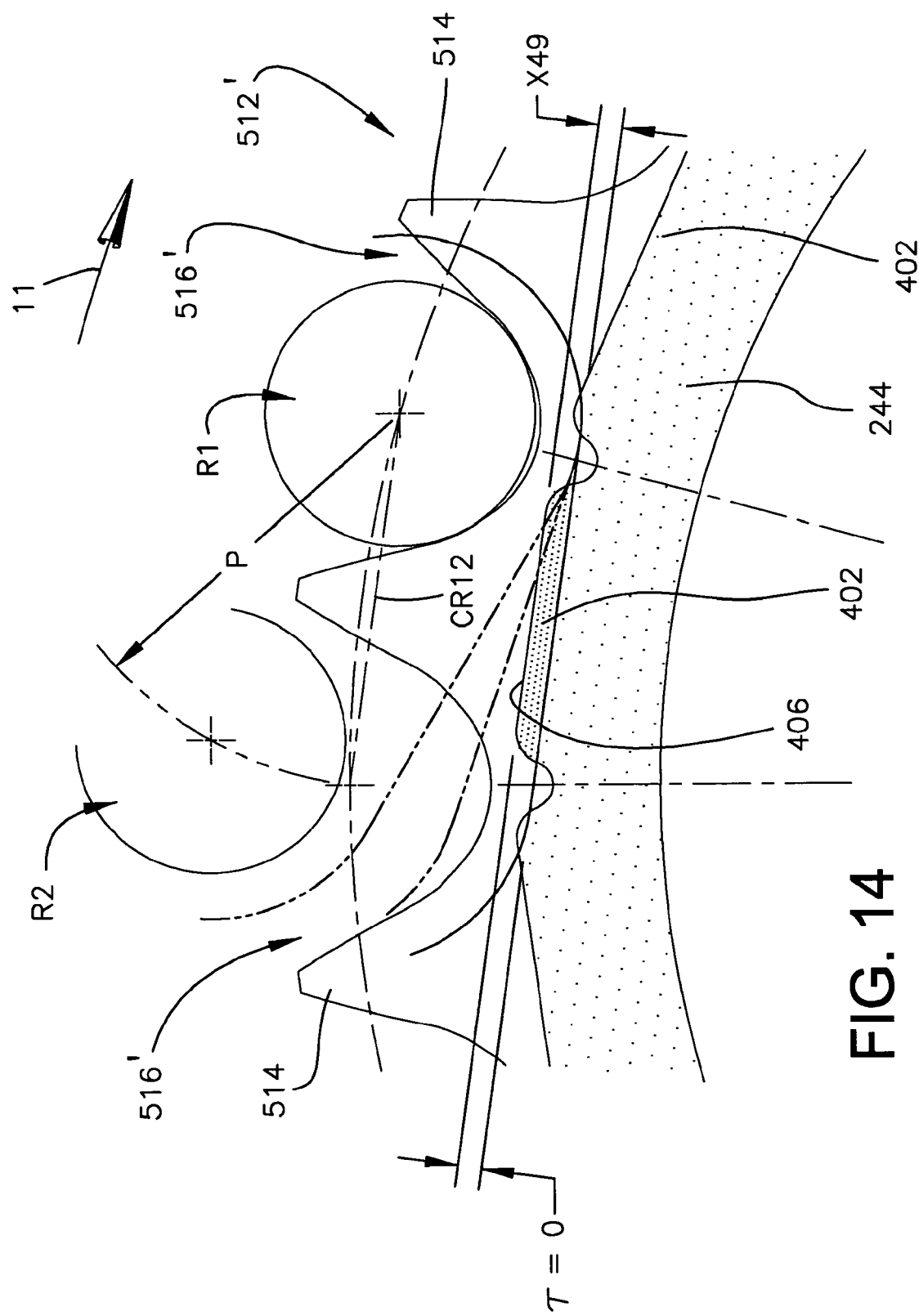
FIG. 14 illustrates the sprocket of FIG. 13b and shows a preferred cushion ring conformation and location where each compression pad comprises a planar surface that is parallel to a chord or line segment that extends between the centers of two adjacent rollers when the rollers are both fully seated in their respective tooth spaces and located adjacent opposite ends of the compression pad.

FIG. 14 illustrates the sprocket 512' of FIG. 13b and shows a preferred cushion ring conformation and location where each compression pad 402 comprises a planar outer surface 406 that is parallel to a chord or line segment CR12 that extends between the centers of two adjacent rollers R1, R2 when the rollers are both fully seated in their respective tooth spaces 516' and located adjacent opposite ends of the compression pad 402. In this manner, the compression pad 402 is compressed a uniform amount X49 by the link extending between the rollers R1, R2. This relationship, wherein the pad is conformed and arranged so that the surface 406 is planar and lies parallel to the line segment CR12 and so that the surface 406 is compressed uniformly along its length by a link extending between the adjacent fully seated rollers R1, R2 is referred to as Tau (T)=0°.

The invention has been described with reference to the preferred embodiment. Obviously, modifications will occur to others upon a reading and understanding of this specification and this invention is intended to include same insofar as they come within the scope of the appended claims or the equivalents thereof.

For instance, it should be appreciated that the tooth space embodiments of the present invention can be classified as being asymmetrical when: i) the engaging side roller seating angle β is greater than the disengaging side roller seating angle β'; and, ii) the engaging side roller seating angle β is equal to disengaging side roller seating angle β' and the engaging side profile is different than the adjacent disengaging side profile, such as when the engaging side includes a flank flat 270 etc. Further, the engaging asymmetrical flank profile could be approximated by an involute form, and the disengaging asymmetrical flank profile could be approximated by a different involute form.

Although the cushion rings 244 have been described herein as being secured to an axially projecting hub of the various sprockets 212, 512, 512', those of ordinary skill in the art will recognize that the one or more cushion rings can be secured directly to the opposite front and/or rear faces of a sprocket instead of to a hub. This will occur, e.g., in connection with a sprocket that does not include an axially extending hub. The cushion ring(s) must simply be located as described herein adjacent the sprocket teeth and tooth spaces to engage the link plates of the associated roller chain as described.

Having thus described the preferred embodiments, the invention is now claimed to be:

1. A sprocket comprising:
   a hub;
   a plurality of teeth projecting radially outward from said hub, wherein circumferentially successive teeth are separated from each other respective tooth spaces each at least partially defined by a radiused root surface defined about root arc center;
   first and second elastomeric cushion rings mounted on said hub and located respectively adjacent opposite first and second axial faces of said teeth, each of said first and second cushion rings defining a plurality of compression pads separated from each other by grooves that extend parallel to a central axis of rotation of said hub, each of said compression pads comprising a planar outer surface defined symmetrically about a circumferential mid-point,
   wherein said grooves are each radially aligned with one of said tooth spaces so that a radial reference line that passes through said central axis of rotation and any one of said root arc centers also intersects one of said groove.

2. The sprocket as set forth in claim 1, wherein each of said plurality of compression pads comprises an outer surface having a leading end and a trailing end located a common radial distance from said central axis of rotation of said hub.

3. The sprocket as set forth in claim 1, wherein said grooves are each defined by at least one radius centered at a groove arc center, and wherein each of said groove arc centers is radially aligned with one of said root arc centers.

4. The sprocket as set forth in claim 1, wherein each of said compression pads is conformed to comprise so that said outer surface that lies parallel to a line segment that extends between two associated rollers of an associated chain when the two associated rollers are fully seated in respective adjacent tooth spaces.

5. The sprocket as set forth in claim 1, wherein said plurality of teeth are separated from each other by an asymmetrical tooth space.

6. The sprocket as set forth in claim 5, wherein said plurality of teeth are separated from each other by a root surface that is conformed with a relieved surface that is spaced from an associated roller when the associated roller is fully seated in said tooth space.

7. The sprocket as set forth in claim 1, wherein said plurality of teeth are separated from each other by an asymmetrical tooth space.

8. The sprocket as set forth in claim 1, wherein said plurality of teeth comprise at least two different tooth profiles.

9. The sprocket as set forth in claim 8, wherein said at least two different tooth profiles are randomly located about said hub.

10. A sprocket comprising:
    a hub;
    a plurality of teeth projecting radially outward from said hub, said plurality of teeth comprising a plurality of first teeth defining a first profile and a plurality of second teeth defining a second profile different from said first profile, wherein said plurality of first and second teeth are arranged in an irregular pattern about said hub, and wherein said teeth are separated from each other by respective tooth spaces;
    first and second elastomeric cushion rings mounted on said hub and located adjacent opposite first and second axial sides of said teeth, respectively, said first and second cushion rings each defining a plurality of compression pads separated from each other by grooves that extend parallel to a central axis of said hub, said grooves each aligned radially with one of said tooth spaces, and each of said compression pads comprising an outer surface having a leading end and a trailing end located a common radial distance from a center said central axis of said hub about which said sprocket rotates.

11. The sprocket of claim 10, wherein said outer surface of each of said compression pads comprises a planar surface.

12. The sprocket as set forth in claim 11, wherein said planar outer surface of each of said compression pads extends between and includes said leading end and said trailing end.

* * * * *